US012586014B2

(12) United States Patent
    Ghorayeb et al.

(10) Patent No.: US 12,586,014 B2
(45) Date of Patent: Mar. 24, 2026

(54) MODULAR HYDROCARBON FACILITY PLACEMENT PLANNING SYSTEM

(71) Applicant: SCHLUMBERGER TECHNOLOGY CORPORATION, Sugar Land, TX (US)

(72) Inventors: Kassem Ghorayeb, Abu Dhabi (AE); Haytham Mounji Dbouk, Beirut (LB); Hussein Mohammad Hayek, Beirut (LB); Ahmad Harb, Beirut (LB); Richard Torrens, Barton Stacey (GB); Owen Wells, Beaconsfield (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 409 days.

(21) Appl. No.: 18/148,468

(22) Filed: Dec. 30, 2022

(65) Prior Publication Data

US 2023/0134304 A1     May 4, 2023

Related U.S. Application Data

(63) Continuation of application No. PCT/US2021/070795, filed on Jun. 30, 2021.
(Continued)

(51) Int. Cl.
    *G06Q 10/0631*      (2023.01)
    *E21B 41/00*        (2006.01)
    (Continued)

(52) U.S. Cl.
    CPC ....... *G06Q 10/06313* (2013.01); *E21B 41/00* (2013.01); *E21B 43/30* (2013.01);
    (Continued)

(58) Field of Classification Search
    CPC ................................. G06F 30/13; G06F 30/18
    See application file for complete search history.

(56) References Cited

U.S. PATENT DOCUMENTS

| | | | |
|---|---|---|---|
| 8,731,887 B2 | 5/2014 | Hilliard | |
| 2016/0011332 A1 | 1/2016 | AlQahtani | |

(Continued)

FOREIGN PATENT DOCUMENTS

| | | | |
|---|---|---|---|
| CN | 102606886 A | * | 7/2012 |
| CN | 105067004 A | | 11/2015 |

(Continued)

OTHER PUBLICATIONS

Zhou, "layout Optimization of Tree-Tree Gas Pipeline Network" Journal of Petroleum Science and Engineering, 2019, 173, pp. 666-680. (Year: 2019).*

(Continued)

*Primary Examiner* — Rutao Wu
*Assistant Examiner* — Zahra Elkassabgi
(74) *Attorney, Agent, or Firm* — Jeffrey D. Frantz

(57) ABSTRACT

A method for identifying locations for components of a hydrocarbon production facility may involve receiving, via a processor, input data having one or more maps representative of an area, a plurality of sets of coordinates for a plurality of wells, and cost data associated with at least one of the plurality of components. The method may also involve determining a set of candidate components that corresponds to the plurality of locations based on the input data and an optimization algorithm and determining additional sets of candidate components that correspond to the plurality of locations based on the input data, the set of candidate locations, and the optimization algorithm. The method may then include generating one or more additional maps indicative of the plurality of locations for the plurality
(Continued)

90 ⟍

| SCENARIO 1 | SCENARIO 2 | SCENARIO 3 | SCENARIO 4 |
|---|---|---|---|
| 100 ⟍ | 100 ⟍ | 100 ⟍ | 100 ⟍ |
| INPUT DATA | INPUT DATA | INPUT DATA | INPUT DATA |
| 92 ⟍ | 92 ⟍ | 92 ⟍ | 102 ⟍ |
| WELL PLACEMENT | WELL PLACEMENT | WELL PLACEMENT | |
| 94 ⟍ | 102 ⟍ | 102 ⟍ | |
| FACILITY PLACEMENT | FACILITY / PIPELINE PLACEMENT | | WELL / FACILITY / PIPELINE PLACEMENT & WELL TRAJECTORY DESIGN |
| 96 ⟍ | | FACILITY / PIPELINE PLACEMENT & WELL TRAJECTORY DESIGN | |
| PIPELINE PLACEMENT | | | |
| 98 ⟍ | 98 ⟍ | | |
| WELL TRAJECTORY DESIGN | WELL TRAJECTORY DESIGN | | |

INCREASING COMPUTATIONAL COMPLEXITY ⟶
104 ⟍ of components based on at least one of the one or more additional sets of candidate components.

19 Claims, 22 Drawing Sheets

Related U.S. Application Data

(60) Provisional application No. 63/200,256, filed on Feb. 24, 2021, provisional application No. 62/705,502, filed on Jun. 30, 2020.

(51) Int. Cl.

| | |
|---|---|
| *E21B 43/30* | (2006.01) |
| *E21B 47/02* | (2006.01) |
| *G06F 30/13* | (2020.01) |
| *G06F 30/18* | (2020.01) |
| *G06Q 10/047* | (2023.01) |
| *G06F 111/06* | (2020.01) |

(52) U.S. Cl.
CPC .............. *E21B 47/02* (2013.01); *G06F 30/13* (2020.01); *G06F 30/18* (2020.01); *G06Q 10/047* (2013.01); *G06F 2111/06* (2020.01)

(56) References Cited

U.S. PATENT DOCUMENTS

| | | | |
|---|---|---|---|
| 2017/0003694 A1 | 1/2017 | Carvajal | |
| 2017/0200103 A1* | 7/2017 | Johnson | .................. G06Q 50/26 |
| 2018/0080781 A1 | 3/2018 | Freed | |
| 2019/0338622 A1 | 11/2019 | Alhasan | |
| 2020/0080406 A1 | 3/2020 | Ghorayeb | |

FOREIGN PATENT DOCUMENTS

| | | |
|---|---|---|
| EP | 2947264 A2 | 11/2015 |
| WO | 2007143751 A2 | 12/2007 |
| WO | 2011096964 A1 | 8/2011 |
| WO | 2013085691 A2 | 6/2013 |
| WO | 2014091461 A1 | 6/2014 |
| WO | 2018200216 A1 | 11/2018 |

OTHER PUBLICATIONS

Kassem, H. S., "Oil and Gas Production System Optimization Using Particle Swarm Optimization", Dissertation, 2019, 103 pages. (Year: 2019).*
Office Action issued in U.S. Appl. No. 18/148,540 dated Apr. 17, 2025, 44 pages.
Atomoclast, "Graph-Based Path Planning: A", Reality Bytes, Aug. 2018, last accessted on Apr. 10, 2025 at [https://realitybytes.blog/2018/08/17/graph-based-path-planning-a/], 9 pages.
Durmez, A. I. et al., "Automatic Pipeline Route Design with Multi-Criteria Evaluation Based on Least-Cost Path Analysis and Line-Based Cartographic Simplification: A Case Study of the Mus Project in Turkey", International Journal of Geo-Information, 2013, 8, 173, 18 pages.
Lee, J. et al., "Graph-based Planning Using Local Information for Unknown Outdoor Environments", IEEE International Conference on Robotics and Automation, Kobe, Japan, 2009, 6 pages.
Dilaveroglu, S., "Optimization for Design and Operation of Natural Gas Transmission Networks", Dissertation, Texas A M University, 2012, 84 pages.
Onwunalu, J. E., "Optimization of Field Development Using Particle Swarm Optimization and New Well Pattern Descriptions", Dissertation, Stanford University, 2010, 139 pages.
Zhang, H. et al., "A unified MILK model for topological structure of production well gathering pipeline network", Journal of Petroleum Science, 2017, 152, pp. 284-293.

Office Action issued in U.S. Appl. No. 18/148,540 dated Nov. 19, 2024, 34 pages.
De Lucena, Rodrigo Ribeiro, et al. "Optimal design of submarine pipeline routes by genetic algorithm with different constraint handling techniques." Advances in Engineering Software 76 (2014): 110-124.
Grobelny, J. and Michalski, R., 2017. A novel version of simulated annealing based on linguistic patterns for solving facility layout problems. Knowledge-Based Systems, 124, pp. 55-69.
Hansen, P., de Luna Pedrosa Filho, E. and Ribeiro, C.C., 1992. Location and sizing of offshore platforms for oil exploration. European Journal of Operational Research, 58(2), pp. 202-214.
He, G., Chen, D., Liao, K., Sun, J. and Nie, S., 2019. A methodology for the optimal design of gathering pipeline system in old oilfield during its phased development process. Computers & Industrial Engineering, 130, pp. 14-34.
He, Guoxi, et al. "Optimization of Gathering and Transmission Pipe Network Layout in Gas Field and Pipeline Route in 3D Terrain." Journal of Pipeline Systems Engineering and Practice 10.2 (2019): 04019009, 15 pages.
Liu, Yang, et al. "Layout optimization of large-scale oil-gas gathering system based on combined optimization strategy." Neurocomputing 332 (2019): 159-183.
Mikolajková, Markéta, et al. "Optimization of a natural gas distribution network with potential future extensions." Energy 125 (2017): 848-859.
Rosa VR et al., "Design optimization of oilfield subsea infrastructures with manifold placement and pipeline layout", Computers & Chemical Engineering, vol. 108, 2018, pp. 163-178, ISSN 0098-1354.
Sanaye, Sepehr, and Javad Mahmoudimehr. "Optimal design of a natural gas transmission network layout." Chemical Engineering Research and Design, vol. 91 (2013): 2465-2476.
Zhang, W., Ma, D., Wei, J.J. and Liang, H.F., 2014. A parameter selection strategy for particle swarm optimization based on particle positions. Expert Systems with Applications, vol. 41, pp. 3576-3584.
First Exam Report issued in Canadian Patent Application No. 3,188,660 dated Jun. 11, 2024, 4 pages.
Extended Search Report issued in European Patent Application No. 219488684.2 dated Jul. 16, 2024, 8 pages.
Office Action issued in U.S. Appl. No. 18/148,495 dated Oct. 29, 2024, 45 pages.
Zhou, J. et al., "Layout optimization of tree-tree gas pipeline network", Journal of Petroleum Science and Engineering, 2019, 173, pp. 666-680.
Abderrahim, Maha, et al. "A Clustering Routing based on Dijkstra Algorithm for WSNs." 2019 19th International Conference on Sciences and Techniques of Automatic Control and Computer Engineering (STA). IEEE, 2019, pp. 605-610.
Al Dossary, M.A. and Nasrabadi, H., 2016. Well placement optimization using imperialist competitive algorithm. Journal of Petroleum Science and Engineering, 147, pp. 237-248.
Almedallah MK et al. "Integrated well-path and surface-facility optimization for shallow-water oil and gas field developments", Journal of Petroleum Science and Engineering. Mar. 1, 2019; 174:859-871.
Almedallah MK et al., "A Numerical Method to Optimize Use of Existing Assets in Offshore Natural Gas and Oil Field Developments", Journal of Natural Gas Science and Engineering. Jul. 1, 2019; 67:43-55.
Campozana, F.P., Dos Santos, R.L., Madeira, M.G., Sousa, S.H.G. and Spinola, M., 2008, January. Optimization of Surface Network and Platform Location using a Next Generation Reservoir Simulator Coupled with an Integrated Asset Optimizer—An Application to an Offshore Deep Water Oil Field in Brazil. In International Petroleum Technology Conference. International Petroleum Technology Conference. IPT 1250, 7 pages.
Dbouk, H., Hayek, H., & Ghorayeb, K. (2020). Modular approach for optimal pipeline layout. Journal of Petroleum Science and Engineering, 107934. 197 (2021), 14 pages.
Doerr, B. and Zheng, W., 2020. From Understanding Genetic Drift to a Smart-Restart Parameter-less Compact Genetic Algorithm.

(56) References Cited

OTHER PUBLICATIONS arXiv preprint arXiv:2004.07141. 30 pages. Available at: chrome-extension://efaidnbmnnnibpcajpcglclefindmkaj/https://arxiv.org/pdf/2004.07141.pdF.

Dogru, S., 1987. Selection of optimal platform locations. SPE Drilling Engineering, 2(04), pp. 382-386.

Eberhart, R. and Kennedy, J., Oct. 1995. A new optimizer using particle swarm theory. In MHS'95. Proceedings of the Sixth International Symposium on Micro Machine and Human Science (pp. 39-43). IEEE.

Fonseca, R.M., Geel, C.R. and Leeuwenburgh, O., 2017. Description of Olympus reservoir model for optimization challenge. Integrated Systems Approach to Petroleum Production. Available at: chrome-extension://efaidnbmnnnibpcajpcglclefindmkaj/https://www.isapp2.com/downloads/olympus-reservoir-model.pdf.

Search Report and Written Opinion of International Patent Application No. PCT/US2021/070795 issued Sep. 16, 2021; 18 pages.

Harb, A., Kassem, H. and Ghorayeb, K., 2019. "Black hole particle swarm optimization for well placement optimization". Computational Geosciences (2020) 24, pp. 1979-2000.

Hart, P.E., Nilsson, N.J. and Raphael, B., 1968. A formal basis for the heuristic determination of minimum cost paths. IEEE transactions on Systems Science and Cybernetics, 4(2), pp. 100-107.

International Preliminary Report on Patentability of International Patent Application No. PCT/US2021/070795 issued Jan. 12, 2023; 12 pages.

Iqbal, Mazhar, et al. "A fast and reliable Dijkstra algorithm for online shortest path." Int. J. Comput. Sci. Eng 5 (2018): 24-27.

Isebor, Obiajulu J, Echeverria Ciaurri, David, and Durlofsky, Louis J., "Generalized field-development optimization with derivative free procedures", SPE Journal Oct. 2014, pp. 891-908.

Kang, Ju Young, and Byung Suk Lee. "Optimization of pipeline route in the presence of obstacles based on a least cost path algorithm and laplacian smoothing." International Journal of Naval Architecture and Ocean Engineering 9.5 (2017): 492-498.

Meisingset, Hilde, Joakim Hove, and Gudmund Olsen. "Optimization of pipeline routes." The Fourteenth International Offshore and Polar Engineering Conference. International Society of Offshore and Polar Engineers, 2004, pp. 50-55.

Min, X. I. A. N. G., and C. H. E. N. Cheng. "Traffic scheduling strategy based on improved Dijkstra algorithm for power distribution and utilization communication network." Journal of Computer Applications 38(6), 2018, 6 pages. (English Abstract provided).

Ou, C. and Lin, W., Jun. 2006. Comparison between PSO and GA for parameters optimization of PID controller. In 2006 International conference on mechatronics and automation (pp. 2471-2475). IEEE.

BP Energy Outlook 2019, Feb. 14, 2019, 5 pages, available at: chrome-extension://efaidnbmnnnibpcajpcglclefindmkaj/https://www.bp.com/content/dam/bp/business-sites/en/global/corporate/pdfs/news-and-insights/press-releases/bp-energy-outlook-2019.pdf.

Panahli, C., 2017. Implementation of Particle Swarm Optimization Algorithm within FieldOpt Optimization Framework—Application of the algorithm to well placement optimization (Master's thesis, NTNU). 106 pages.

Park, H.Y., Yang, C., Al-Aruri, A.D. and Fjerstad, P.A., 2017. Improved decision making with new efficient workflows for well placement optimization. Journal of Petroleum Science and Engineering, 152, pp. 81-90.

Rocha, Djalene Maria, et al. "Optimization of submarine pipeline routes considering slope stability." Offshore Technology Conference. OTC-25711-MS, 2015, 16 pages.

Rodrigues, H.W.L., Prata, B.D.A. and Bonates, T.O., 2016. Integrated optimization model for location and sizing of offshore platforms and location of oil wells. Journal of Petroleum Science and Engineering, 145, pp. 734-741.

Rosa and Martins Ferreira Filho, 2012, "Optimizing the location of platforms and manifolds", Proceedings of the ASME 2012 31st International Conference on Ocean, Offshore and Arctic Engineering, OMAE2012-84211, 7 pages.

Sales, L.D.P.A., Pitombeira-Neto, A.R. and de Athayde Prata, B., 2018. "A genetic algorithm integrated with Monte Carlo simulation for the field layout design problem", Oil & Gas Sciences and Technology—Revue d'IFP Energies nouvelles, vol. 73, issue 24, 16 pages.

Watson Jr, W.S., Mahaffey, D.W., Still, J.P. and Taylor, R.D., 1989, January. PLATLOC: A program for optimizing offshore platform locations. In Petroleum Computer Conference. Society of Petroleum Engineers. pp. 61-70.

Liu, Q. et al., "An intelligent optimization method for oil-gas gathering and transportation pipeline network layout", 2016 Chinese Control and Decision Conference (CCDC), IEEE, 2016. (Year: 2016).

Liu, X., "Pipeline network layout design of integrated energy system based on energy station site selection and load complementary characteristics", IEEE Access 8 (2020): 92776-92790. (Year: 2020).

Goodarzi, E. et al., "Multiobjective Optimization", In: Introduction to Optimization Analysis in Hydrosystem Engineering. Topics in Safety, Risk, Reliability and Quality, vol. 25. Springer, Cham. Https://doi.org/10.1007/978-3-319-04400-2_4 (Year: 2014).

Rodriguez, D. A. et al., "Simulated annealing optimization for hydrocarbon pipeline networks", Industrial Engineering Chemistry Research 52.25 (2013): 8579-8588. (Year: 2013).

Ribeiro de Lucena, R. et al., "Optimal design of submarine pipeline routes by genetic algorithm with different constraint handling techniques", Advances in Engineering Software, 2014, 75, pp. 110-124.

Kassem, H. S., "Oil and Gas Production System Optimization Using Particle Swarm Optimization", Dissertation, 2019, 103 pages.

* cited by examiner

50

PLANNING SYSTEM

| COMMUNICATION | ～52 |
| PROCESSOR | ～54 |
| MEMORY | ～56 |
| STORAGE | ～58 |
| I/O PORTS | ～60 |
| DISPLAY | ～62 |

110

READ INPUT DATA —112

INITIALIZE PARAMETERS AND NODES —114

RANDOMIZE NODE LOCATIONS —116

NODE CLUSTERING —118

COST CALCULATION —120

UPDATE OPTIMIZATION PARAMETERS —122

UPDATE PSO —124

CHECK CONVERGENCE ? —126     YES     OPTIMIZED SOLUTION     128

NO

CHECK NUMBER OF ITERATIONS ? —130     MULTIPLE OF $N_{Init}^{S}$     SMART RESTART     132

NO

```
<layers>
  <layer-1>
    <nodes>
      <node-1-1>  (i, j)  </node-1-1>
      <node-1-2>  (i, j)  </node-1-2>
      <node-1-3>  (i, j)  </node-1-3>
      <node-1-4>  (i, j)  </node-1-4>
    </nodes>
  </layer-1>
  <layer-2>
    <nodes>
      <node-2-1>  (i, j)  </node-2-1>
      <node-2-2>  (i, j)  </node-2-2>
    </nodes>
  </layer-2>
</layers>
```

144 — CALCULATE EUCLIDIAN DISTANCES FROM ALL NODES IN LAYER I TO ALL NODES IN LAYER I+1

146 — RANK CALCULATED DISTANCES IN ASCENDING ORDER

148 — ASSIGN EVERY NODE IN LAYER I TO THE NEAREST NODE IN LAYER I+1

150 — UPDATE NODES / CLUSTERS LIST IN LAYER I+1

152 — CHECK I = N ?　　NO　　I = I+1 — 154

YES

156 — FINALIZE CLUSTERING AND UPDATE PSO

160 ⟍

| RECEIVE SURFACE MAP |—162

TRANSFORM SURFACE MAP INTO CORRESPONDING COST GRAPH —164

RECEIVE START POINT AND TARGET POINT OF EACH PIPELINE —166

A* SHORTEST PATH ALGORITHM —168

FINALIZE THE OPTIMAL PATH FOR EACH PIPELINE IN THE NETWORK —170

180

186 — TOP VIEW

182 — PIPELINE STARTING POINT

194

190

190 — MOUNTAIN

198

196

192 — PROHIBITED AREA

190

184 — PIPELINE TARGET POINT

188 — CROSS-SECTION VIEW

182

190

196

190

184

198

MODULAR HYDROCARBON FACILITY PLACEMENT PLANNING SYSTEM

CROSS REFERENCE PARAGRAPH

This application is a continuation application of pending PCT Application No. PCT/US2021/070795, filed on Jun. 30, 2021, which claims the benefit of U.S. Provisional Application No. 62/705,502, entitled "MODULAR APPROACH FOR OPTIMAL PIPELINE PLANNING," filed Jun. 30, 2020, and U.S. Provisional Application No. 63/200,256, entitled "MODULAR HYDROCARBON FACILITY PLACEMENT PLANNING SYSTEM," filed Feb. 24, 2021. The contents of the disclosures are hereby incorporated herein by reference.

BACKGROUND

This disclosure relates generally to automated planning and placement of hydrocarbon, wells facilities, and piping.

As hydrocarbons are extracted from hydrocarbon reservoirs via hydrocarbon wells in oil and/or gas fields, the extracted hydrocarbons may be transported to various types of equipment, tanks, processing facilities, and the like via transport vehicles, a network of pipelines, and the like. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

Automated planning techniques for identifying suitable locations and placements for components used for hydrocarbon extraction, processing, and distribution operations may involve a significant amount of processing power and hardware to efficiently determine suitable locations for various components in view of geographical considerations, cost considerations, and the like. That is, systems for determining suitable locations for components of a hydrocarbon operation may take days to process the relevant information and identify suitable solutions. Moreover, these systems may identify suitable locations for a limited number of components (e.g., 10-20 wells, drill centers, gathering centers, and/or central processing centers) that make up the hydrocarbon operation. The delay and limited number of components analyzed in determining the suitable locations may result in delayed operations, higher costs, and reduced efficiencies in processes related to hydrocarbon extraction and processing.

This section is intended to introduce the reader to various aspects of art that may be related to various aspects of the present techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a method for determining a layout for a hydrocarbon production site may include receiving, via a processor, input data including geological data associated with an area, a computational resource parameter, and an indication of a set of components to be placed in the layout. The set of components may include one or more wells, two or more facilities, one or more pipelines between the facilities, and one or more well trajectories between the wells and at least one of the facilities. The method may also include selecting, via the processor, one of a set of planning scenarios to implement in determining the layout based on the computational resource parameter. Additionally, the method may include, in response to selecting one of the planning scenarios, determining a set of well placements for the wells based on a first algorithm and the geological data. The method may also include simultaneously determining a set of facility placements for the facilities, a set of well trajectories for the wells, and a set of pipeline placements for the pipelines based on a second algorithm. The set of pipeline placements may identify a path between the facilities based on a third algorithm and a graphical topology of the geological data weighted by costs associated with placing the pipelines at respective portions of the area.

In some embodiments, the first algorithm may include the second algorithm as an inner iterative loop.

In some embodiments, the computational resource parameter may include a user set threshold time limit in which completion of the layout determination is requested.

In some embodiments, the computational resource parameter may include a user preference indicating a priority between a computation efficiency associated with determining the layout and an accuracy of optimization of the layout.

In some embodiments, the method may include, in response to selecting a second planning scenario of the set of planning scenarios, determining the set of well placements for the one or more wells based on the first algorithm and the geological data. Additionally, in response to selecting the second planning scenario, the method may include simultaneously determining the set of facility placements for the facilities and a set of pipeline placements for the pipelines based on the second algorithm. Additionally, independently from the simultaneous determining, the method may include determining the set of well trajectories for the wells based on a fourth algorithm.

In some embodiments, the fourth algorithm may include a particle swarm optimization algorithm configured to penalize dog-leg severity having a value greater than a threshold amount.

In some embodiments, the first algorithm and the second algorithm may include first and second particle swarm optimization algorithms, respectively.

In some embodiments, the third algorithm may be an A* algorithm.

In a second embodiment, a method for determining pipeline placement for one or more pipelines between two or more facilities may include receiving, via a processor, input data such as topological data associated with an area and cost data associated with the pipeline placement in respective portions of the area. The method may also include determining, via the processor, a path between the facilities based on a first algorithm and the topological data augmented by the cost data. Additionally, the method may include determining, via the processor, a set of pipeline placements for the pipelines based on the path.

In some embodiments, determining the set of pipeline placements may include simultaneously determining the set of pipeline placements and a set of facility placements for the facilities based on a second algorithm.

In some embodiments, determining the set of pipeline placements may include simultaneously determining a set of facility placements for the facilities, a set of well trajectories for one or more wells, and the set of pipeline placements for the pipelines based on a second algorithm.

In some embodiments, the second algorithm may include a particle swarm optimization algorithm.

In some embodiments, the method may include determining, independent of the simultaneous determining, a set of well placements for one or more wells via a third algorithm.

In some embodiments, the method may include transforming a map acquired via the topological data to a cost graph based on the cost data.

In some embodiments, determining the path between the facilities is based on an A* algorithm applied to the cost graph.

In a third embodiment, a method for determining a layout for a hydrocarbon production site may include receiving, via a processor, input data such as geological data associated with an area and an indication of a set of components to be placed in the layout. The set of components may include two or more facilities and one or more pipelines between the two or more facilities. Additionally, the method may include simultaneously determining a set of facility placements for the facilities and a set of pipeline placements for the pipelines based on the geological data, the indication of the set of components, and a first algorithm.

In some embodiments, simultaneously determining the set of facility placements and the set of pipeline placements may include iteratively determining a set of candidate pipeline placements based on the geological data and a second algorithm within an iterative loop of the first algorithm.

In some embodiments, determining the set of pipeline placements may include determining a shortest path between the facilities based on the second algorithm and a graphical topology of the geological data weighted by costs associated with placing the pipelines at respective portions of the area.

In some embodiments, simultaneously determining the set of facility placements and the set of pipeline placements may include simultaneously determining a set of well placements for one or more wells, a set of facility placements for the facilities, a set of well trajectories between the wells and at least one of the facilities, and a set of pipeline placements for the pipelines between the facilities based on the first algorithm.

In some embodiments, the method may include rectifying, during the first algorithm, an unfeasible candidate well trajectory of a well by changing a drilling center associated with the well or rotating the well.

In a fourth embodiment, a method for determining a layout for a hydrocarbon production site may include receiving, via a processor, input data such as geological data associated with an area, an indication of a set of components to be placed in the layout. The set of components may include one or more wells, two or more facilities, one or more pipelines between the facilities, and one or more well trajectories between the wells and at least one of the facilities. The method may also include simultaneously determining a set of facility placements for the facilities, a set of well trajectories for the wells, a set of pipeline placements for the pipelines, and a set of well placements for the wells based on the geological data and a first algorithm having nested iterative loops.

In some embodiments, determining the set of pipeline placements may include determining a shortest path between the facilities based on a second algorithm and a graphical topology of the geological data weighted by costs associated with placing the pipelines at respective portions of the area.

In some embodiments, the input data may include at least one fixed well placement.

In some embodiments, the method may include selecting, via the processor, one of a set of planning scenarios to implement in determining the layout based on a computational resource parameter specified in the input data. The computational resource parameter may be indicative of a priority between a computation efficiency associated with determining the layout and an accuracy of optimization of the layout.

In a fifth embodiment, a method for identifying a plurality of locations for a plurality of components of a hydrocarbon production facility may involve receiving, via a processor, input data having one or more maps representative of an area, a plurality of sets of coordinates for a plurality of wells, and cost data associated with at least one of the plurality of components. The method may also involve determining a set of candidate components that corresponds to the plurality of locations based on the input data and a first algorithm and determining one or more additional sets of candidate components that correspond to the plurality of locations based on the input data, the set of candidate locations, and the first algorithm. The method may then include generating one or more additional maps indicative of the plurality of locations for the plurality of components based on at least one of the one or more additional sets of candidate components.

In some embodiments, the input data may include a set of physical layers associated with the area, logical layer data representative of a set of logical layers associated with different operations performed by the hydrocarbon production site, one or more prohibited areas within the area, or any combination thereof.

In some embodiments, determining the set of candidate components may include identifying a first set of locations for a first set of candidate components associated with the plurality of locations within at least two portions of the plurality of logical layers based on the first algorithm, which may be a particle swarm optimization algorithm. Determining the set of candidate components may also include grouping a first portion of the first set of candidate components based on one or more distances between two or more candidate components of the first portion of the first set of candidate components and determining an updated first set of locations based on the first portion of the first set of candidate components and capacity data associated with the first set of candidate components. Additionally, determining the set of candidate components may include determining a first total cost for building the hydrocarbon production site based on the updated first set of locations, connection cost data associated with providing fluid connections between at least some components of the first portion of the first set of candidate components.

In some embodiments, determining the one or more additional sets of candidate components may include identifying a second set of locations for a second set of candidate components associated with the plurality of locations based on the input data, the particle swarm optimization algorithm, and the updated first set of locations. Determining the set of candidate components may also include grouping a second portion of the second set of candidate components based on one or more additional distances between two or more additional candidate components of the second portion of the second set of candidate components. Additionally, determining the set of candidate components may also include determining an updated second set of locations based on the second portion of the second set of candidate components and additional capacity data associated with the second set of candidate components, and determining a second total cost for building the hydrocarbon production site based on the updated second set of locations, additional connection cost data associated with providing additional fluid connections between at least some components of the second portion of the second set of candidate components.

In some embodiments, the method may include determining, via the processor, a set of candidate well placements based on the input data and a second algorithm, and determining, via the processor, one or more additional sets of candidate well placements based on the input data, the set of candidate well placements, and the second algorithm. Additionally, the method may include generating, via the processor, the plurality of sets of coordinates based on the one or more additional sets of candidate well placements.

In some embodiments, the method may include determining, via the processor, a second set of candidate components that corresponds to a plurality of well trajectories based on the input data and a second algorithm. The method may also include determining, via the processor, one or more second additional sets of candidate components that correspond to the plurality of well trajectories based on the input data, the second set of candidate components, and the second algorithm. Additionally, the method may include generating, via the processor, the plurality of well trajectories based on the one or more second additional sets of candidate components.

In some embodiments, determining the set of candidate components may include simultaneously determining a set of candidate facility placements and a set of candidate pipeline routes between at least two of the set of candidate facility placements.

In some embodiments, determining the set of candidate components may include simultaneously determining a set of candidate facility placements, a set of candidate pipeline routes between at least two of the set of candidate facility placements, and a set of well trajectories between the plurality of sets of coordinates for the plurality of wells and the set of candidate facility placements.

In some embodiments, determining the set of candidate components may include simultaneously determining a set of candidate well placements, a set of candidate facility placements, a set of candidate pipeline routes between at least two of the set of candidate facility placements, and a set of well trajectories between the set of candidate well placements and the set of candidate facility placements.

In some embodiments, determining the set of candidate components may include simultaneously determining a plurality of different types of candidate components.

In some embodiments, identifying the plurality of locations for the plurality of components may include determining a set of pipeline placements between a set of facility locations for the hydrocarbon production site based on an A* algorithm.

In some embodiments, the set of pipeline placements may include one or more optimal routes between the set of facility locations.

In some embodiments, the one or more optimal routes account for topological complexities comprising mountains, valleys, faults, or any combination thereof.

In some embodiments, the set of pipeline placements avoids one or more prohibited areas.

In some embodiments, the maps representative of the area may include structured maps having quadrilateral grid blocks.

In some embodiments, the first algorithm may include a particle swarm optimization algorithm.

In a sixth embodiment, a hydrocarbon production site planning system may include one or more processors and one or more memories comprising instructions that, when executed by the one or more processors, cause the one or more processors to identify a plurality of locations for a plurality of components of the hydrocarbon production site. Identifying the plurality of locations for the plurality of components may include receiving, via the one or more processors, input data comprising one or more maps representative of an area, a plurality of sets of coordinates for a plurality of wells, and cost data associated with at least one of the plurality of components. Identifying the plurality of locations may also include determining, via the one or more processors, a set of candidate components that corresponds to the plurality of locations based on the input data and an algorithm, and determining, via the one or more processors, one or more additional sets of candidate components that correspond to the plurality of locations based on the input data, the set of candidate components, and the algorithm. Additionally, identifying the plurality of locations may include generating, via the one or more processors, one or more additional maps indicative of the plurality of locations for the plurality of components based on at least one of the one or more additional sets of candidate components.

In some embodiments, the algorithm may be a particle swarm optimization algorithm.

In a seventh embodiment, a computer program may include instructions for implementing any of the above methods.

In an eighth embodiment, a non-transitory computer-readable medium may include instructions for implementing any of the above methods.

Various refinements of the features noted above may be made in relation to various aspects of this disclosure. Further features may also be incorporated in these various aspects as well. These refinements and additional features may be made individually or in any combination. For instance, various features discussed below in relation to one or more of the illustrated embodiments may be incorporated into any of the above-described aspects of this disclosure alone or in any combination. The brief summary presented above is intended only to familiarize the reader with certain aspects and contexts of embodiments of this disclosure without limitation to the claimed subject matter.

For clarity and simplicity of description, not all combinations of elements provided in the aspects of the invention recited above have been set forth expressly. Notwithstanding this, the skilled person will directly and unambiguously recognize that unless it is not technically possible, or it is explicitly stated to the contrary, the consistory clauses referring to one aspect of the embodiments described herein are intended to apply mutatis mutandis as optional features of every other aspect of the invention to which those consistory clauses could possibly relate.

BRIEF DESCRIPTION OF THE DRAWINGS

Various features, aspects, and advantages of this disclosure will become better understood when the following detailed description is read with reference to the accompanying figures in which like characters represent like parts throughout the figures, wherein:

FIG. 6 is an example of a candidate solution for a two-layer facility, according to one or more embodiments of this disclosure;

DETAILED DESCRIPTION

Figure 1:
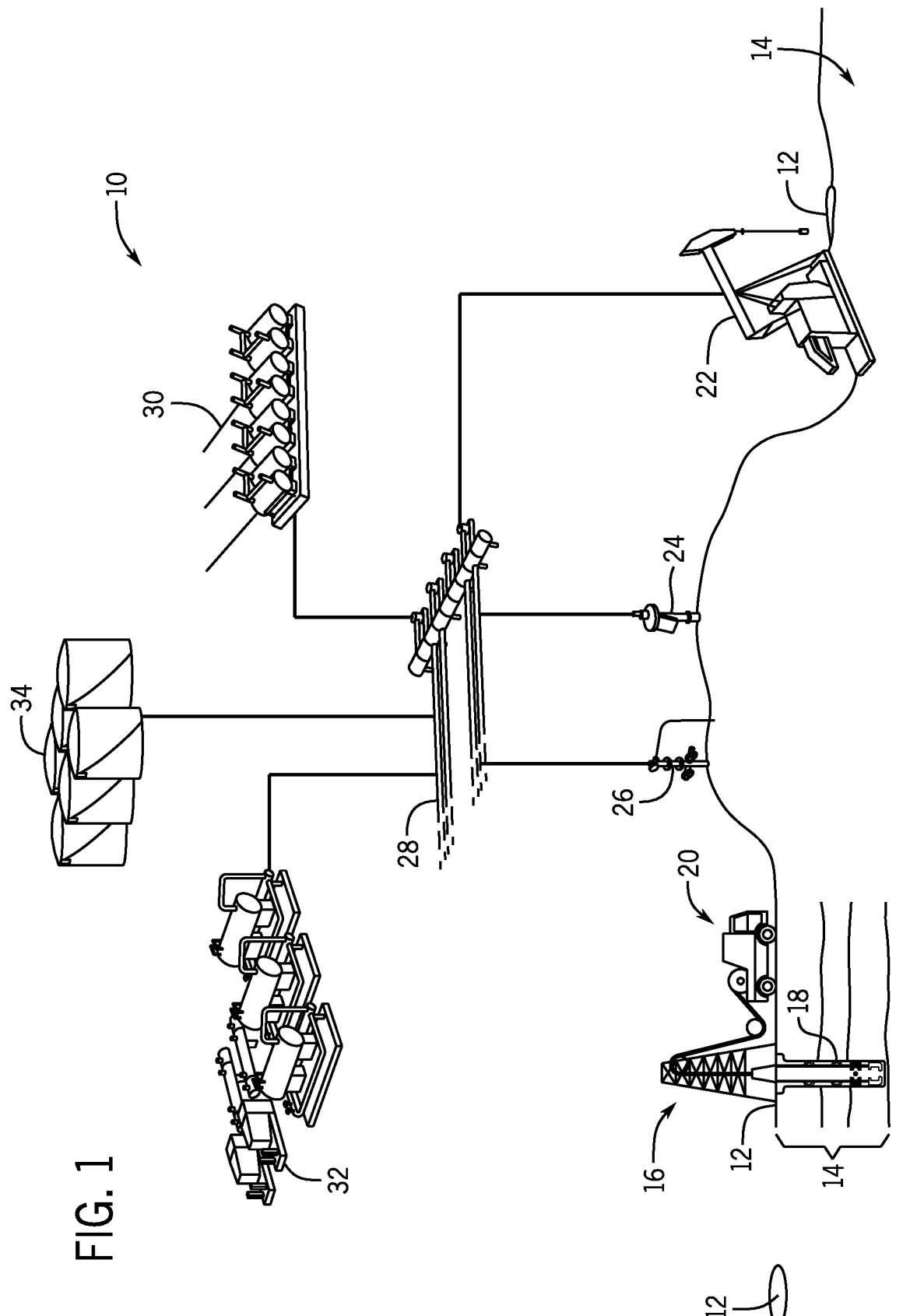
FIG. 1 illustrates a schematic diagram of an example hydrocarbon site that may produce and process hydrocarbons, according to one or more embodiments of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of this disclosure, the articles "a," "an," and "the" are intended to mean that there are one or more of the elements. The terms "including" and "having" are used in an open-ended fashion, and thus should be interpreted to mean "including, but not limited to . . . ." Any use of any form of the terms "couple," or any other term describing an interaction between elements is intended to mean either an indirect or a direct interaction between the elements described.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Hydrocarbon sites may include a number of components that facilitates the extraction, processing, and distribution of hydrocarbons (e.g., oil) from a well or well site. When initially analyzing a potential hydrocarbon extraction site, a number of factors are considered to identify the types of facilities to place at the hydrocarbon site, the locations of the facilities, the distance between facilities, the locations of the reservoir well sections (e.g., wells themselves), well trajectories, the placement of pipelines between such facilities, and the like. For example, the locations of the wells themselves, well trajectories, the placement of facilities, and/or the placement of pipelines between such facilities may be analyzed for viability, time or cost efficiency, reservoir production, or any combination thereof.

Although a wide variety of solutions or arrangement of components and locations may be determined for a particular hydrocarbon site, certain arrangements and locations may result in an overall lower operational cost, a lower construction cost, a higher production efficiency, and other favorable metrics as compared to other sets of solutions. As more solutions that improve the efficient use of resources (e.g., time, money, supplies) for commissioning the construction and operations of facilities in the hydrocarbon site are determined, an optimal facility placement plan may be identified. As used herein, optimal may refer to solution sets or determined arrangements that incur the least amount of costs, provide the most efficient amount of production speed, use the least amount of resources, or a combination of these properties as compared to other solutions for the production and placements of facilities in the hydrocarbon site. Moreover, in some embodiments, the optimal solution may be based on user selectable parameters such as threshold costs, resource expenditures, hydrocarbon production, and/or the processing time to achieve the solution. In addition, as used herein, optimal solutions may also include improved solutions that are more efficient in cost, time, distance, and the like. As such, optimal routes may include improved routes relative to previously determined routes with respect to cost, time, distance, and the like. In the same manner, optimal placement may include improved placements relative to previously determined placements with respect to cost, time, distance, and the like.

With this in mind, the present embodiments described herein are related to systems and methods for iteratively identifying a set of components or facilities for a hydrocarbon site and locations for the set of components, such that each identified set of components may involve a lower construction cost, a lower operational cost, more efficient transfer of hydrocarbons, more efficient extraction of hydrocarbon, and the like. That is, the present embodiments described herein are related to hydrocarbon field development planning operations that identifies suitable (e.g., optimal) facility placements, pipeline placements, and/or well placements and/or trajectories for various hydrocarbon extraction and processing operations.

To effectively plan and identify suitable components (e.g., facilities, pipelines, and/or wells) and suitable component locations for the hydrocarbon site, a planning system may consider a wide array of variables related to the geographical properties of the area in which the hydrocarbons are being extracted. Indeed, the identification process may be integrated with well placement design and well trajectory design, each of which poses a challenge in the field development planning operations (e.g., at concept screening phase). During this initial planning phase, the planning system may assess multiple concepts that involve a collection of components arranged in different locations with respect to a period of time (e.g., desired project timeline).

Some planning systems use integrated workflows that become prohibitively expensive with respect to cost and computational processing power. That is, the planning systems may identify sets of components that exceed a desired project cost, may take more than a threshold amount of time (e.g., days, months) to produce, or the like. Indeed, identifying suitable placements for facilities may involve minimizing costs for producing (e.g., constructing, operating) certain facilities while accounting for topological complexities of the area, prescribed capacities of the respective facilities and hydrocarbon operations, trajectory constraints for distributing the extracted or processed hydrocarbons, and the like. By way of example, the planning system may select an optimal or suitable number and location of the different "nodes," which may correspond to types of facilities, locations of the facilities, wells or well placements and the paths of the connections (e.g., pipelines or well trajectories) between nodes, and the like.

Unlike other optimization schemes, which may be prohibitively slow with exhaustive search parameters and fail to account for the various topological complexities typically encountered in real scenarios, the present embodiments provide a more efficient analysis that reduces the amount of processing power employed by computing systems tasked to identify suitable components, component placement, and connectivity components within a hydrocarbon site. In other words, other optimization schemes are limited by certain memory and computational parameters of existing computing systems to provide useful facilities recommendations for hydrocarbon site planning operations. Furthermore, processing of different sets/types of nodes may be done modularly (e.g., set portions) to accommodate for various complexities of the analysis, which may allow for the ability to trade computer processing time/resources for precision of the optimal solution. For example, complexity may be increased by simultaneously solving for well placement, facility placement, and pipeline placement versus solving for well placement, facility placement, and pipeline placement in a particular sequence or order using results of a previous analysis to perform a subsequent analysis. However, in some scenarios, the increased complexity may lead to improved optimal solutions. As used herein, simultaneous processing, analysis, or solving may generally mean that components are considered together (e.g., as part of the same algorithm or cost function) in a single analysis as opposed to sequential analysis. Furthermore, the optimal solution may be a solution found in a given amount of time or number of computer iterations, such that the solution corresponds to a time efficient and cost-effective solution relative to sequential analysis techniques.

With the foregoing in mind, this disclosure includes a planning system that may employ one or more algorithms such as a particle swarm optimization (PSO) algorithm to identify components (e.g., facilities, wells, pipelines, etc.) and locations/placements for components that may be part of a hydrocarbon site. In addition, the planning system may couple different algorithms, such as the PSO algorithm and the A* searching algorithm to determine pipelines layouts that may be used between various identified components. In certain embodiments, the planning system may invoke a modular modular approach for facility and/or well placement optimization by analyzing various levels of problem complexity with regard to placement of the components. For example, the PSO algorithm may account for different component layers (e.g., hierarchical layers, operational functions within different hierarchical levels), topological complexity of the hydrocarbon site and surround areas, any prohibited or inaccessible areas, and the like. By employing the PSO algorithm in this modular fashion, the present embodiments may significantly reduce the amount of time and processing power previously used by other (e.g., traditional) planning systems to identify components and locations for components of the hydrocarbon site during design phases. Additional details related to a process for identifying components and locations for components of a hydrocarbon site based on non-gradient based algorithms such as the PSO algorithm with the A* searching algorithm will be discussed below. Furthermore, while certain aspects of the present disclosure are discussed as using the PSO algorithm, as should be appreciated, additional or substitute algorithms may be used in different scenarios such as black hole particle swarm optimization (BHPSO), differential evolution (DE), or other suitable (e.g., non-gradient based) algorithm.

By way of introduction, FIG. 1 illustrates a schematic diagram of an example hydrocarbon site 10 where hydrocarbon products, such as crude oil and natural gas, may be extracted from the ground, processed, and stored. In accordance with the present embodiments, the hydrocarbon site 10 may include a number of components or facilities that correspond to wells, processing facilities, collection components, distribution networks, and the like. During the design phase of planning for the types of components to use at the hydrocarbon site 10, the locations of the components at the hydrocarbon site 10, and other design properties, a variety of factors are taken under consideration.

Indeed, hydrocarbon production systems are becoming more and more complex as the demands of affordable and sustainable energy sources grows. As such, the evolving growth in energy demand cultivates into an increase demand for economically efficient field layout patterns. With this in mind, the present embodiments provide facility placement layout optimization techniques within the hydrocarbon site 10 to develop a design for the hydrocarbon site 10 that maximizes one or more driving values, such as a net present value or hydrocarbons recovery factor. Scenarios, from a subsurface point of view, may encompass a wide range of elements including well count, component placement, component type, control schemes, operation schedules, and other parameter to increase a profitability of hydrocarbon development projects. As such, the present embodiments described herein may provide improved systems and methods for generating design plans for the hydrocarbon site 10 based on the example components described below.

Referring now to FIG. 1, the hydrocarbon site 10 may include a number of wells 12 disposed within a geological formation 14. The wells 12 may include drilling platform 16 that may have performed a drilling operation to drill out a wellbore 18. Additionally, as used herein, wells 12 may generally refer to physical components such as the drilling platform 16 and wellbore 18 and/or the general area of the reservoir in which extraction is desired (e.g., a reservoir well section). The drilling operations may include drilling the wellbore 18, injecting drilling fluids into the wellbore 18, performing casing operations within the wellbore 18, and the like. In addition to including the drilling platform 16, the hydrocarbon site 10 may include surface equipment 20 that may carry out certain operations, such as cement installation operation, well logging operations to detect conditions of the wellbore 18, and the like. As such, the surface equipment 20 may include equipment that store cement slurries, drilling fluids, displacement fluids, spacer fluids, chemical wash fluids, and the like. The surface equipment 20 may include piping and other materials used to transport the various fluids described above into the wellbore 18. The surface equipment 20 may also include pumps and other equipment (e.g., batch mixers, centrifugal pumps, liquid additive metering systems, tanks, etc.) that may fill in the interior of a casing string with the fluids discussed above.

In addition to the equipment used for drilling operations, the hydrocarbon site may include a number of well devices that may control the flow of hydrocarbons being extracted from the wells 12. For instance, the well devices in the hydrocarbon site 10 may include pumpjacks 22, submersible pumps 24, well trees 26, and the like. The pumpjacks 22 may mechanically lift hydrocarbons (e.g., oil) out of the well 12 when a bottom hole pressure of the well 12 is not sufficient to extract the hydrocarbons to the surface. The submersible pump 24 may be an assembly that may be submerged in a hydrocarbon liquid that may be pumped. As such, the submersible pump 24 may include a hermetically sealed motor, such that liquids may not penetrate the seal into the motor. Further, the hermetically sealed motor may push hydrocarbons from underground areas or the reservoir to the surface. The well trees 26 may be an assembly of valves, spools, and fittings used for natural flowing wells. As such, the well trees 26 may be used for an oil well, gas well, water injection well, water disposal well, gas injection well, condensate well, and the like. By way of reference, the wells 12 may be part of a first hierarchical level and the well devices that extract hydrocarbons from the wells 12 may be part of a second hierarchical level above the first hierarchical level. Each hierarchical level may include a number of components and the presently disclosed techniques may account for these levels when determining the design plans for the hydrocarbon site 10.

After the hydrocarbons are extracted from the surface via the well devices, the extracted hydrocarbons may be distributed to other devices via a network of pipelines 28. That is, the well devices of the hydrocarbon site 10 may be connected together via a network of pipelines 28. In addition to the well devices described above, the network of pipelines 28 may be connected to other collecting or gathering components, such as wellhead distribution manifolds 30, separators 32, storage tanks 34, and the like.

In some embodiments, the pumpjacks 22, the submersible pumps 24, well trees 26, wellhead distribution manifolds 30, separators 32, and storage tanks 34 may be connected together via the network of pipelines 28. The wellhead distribution manifolds 30 may collect the hydrocarbons that may have been extracted by the pumpjacks 22, the submersible pumps 24, and the well trees 26, such that the collected hydrocarbons may be routed to various hydrocarbon processing or storage areas in the hydrocarbon site 10. The separator 32 may include a pressure vessel that may separate well fluids produced from oil and gas wells into separate gas and liquid components. For example, the separator 32 may separate hydrocarbons extracted by the pumpjacks 22, the submersible pumps 24, or the well trees 26 into oil components, gas components, and water components. After the hydrocarbons have been separated, each separated component may be stored in a particular storage tank 34. The hydrocarbons stored in the storage tanks 34 may be transported via the pipelines 28 to transport vehicles, refineries, and the like.

Although the hydrocarbon site 10 is described above with certain components, it should be understood that the hydrocarbon site 10 may include additional, fewer, or different components. For example, although discussed above in relation to a hydrocarbon site 10 on land, present embodiments may also include analysis of off-shore hydrocarbon sites 10 and the components thereof. That is, the embodiments described herein are directed to determining a design for any suitable hydrocarbon site that may include various types of components that is related to the production and distribution of hydrocarbons. In this way, the components depicted in FIG. 1 are provided as an example context in which the embodiments described herein may be implemented. As such, the embodiments of this disclosure should not be limited to the components listed in FIG. 1. Moreover, additional components relating to on- or off-shore hydrocarbon production may be implemented as additional layers (e.g., hierarchical or functional) in the modular planning system.

Keeping this in mind, the present embodiments described herein may include systems and methods for identifying components (e.g., well devices) and locations for components in the hydrocarbon site 10 based on design data related to the hydrocarbon site. By way of operation, a planning system 50, as presented in FIG. 2, may receive the input data and identify a set of locations for the components in the hydrocarbon site 10 based on an optimization algorithm such as the particle swarm optimization (PSO) algorithm according to a process that will be described in greater detail below with reference to FIG. 4.

Figure 2:
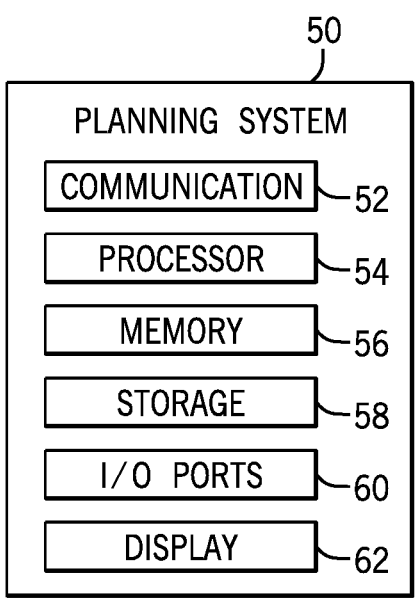
FIG. 2 illustrates a block diagram of various components that may be part of a planning system for determining locations of components that may be part of the hydrocarbon site of FIG. 1, according to one or more embodiments of this disclosure.

Referring now to FIG. 2, the planning system 50 may include any suitable computing device, cloud-computing device, or the like and may include various components to perform various analysis operations. As shown in FIG. 2, the planning system 50 may include a communication component 52, a processor 54, a memory 56, a storage component 58, input/output (I/O) ports 60, a display 62, and the like. The communication component 52 may be a wireless or wired communication component that may facilitate communication between different monitoring systems, gateway communication devices, various control systems, and the like. The processor 54 may be any type of computer processor or microprocessor capable of executing computer-executable code. The memory 56 and the storage component 58 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 54 to perform the presently disclosed techniques. The memory 56 and the storage component 58 may also be used to store data received via the I/O ports 60, data analyzed by the processor 54, or the like.

The I/O ports 60 may be interfaces that may couple to various types of I/O modules such as sensors, programmable logic controllers (PLC), and other types of equipment. For example, the I/O ports 60 may serve as an interface to pressure sensors, flow sensors, temperature sensors, and the like. As such, the planning system 50 may receive data associated with a well via the I/O ports 60. The I/O ports 60 may also serve as an interface to enable the planning system 50 to connect and communicate with surface instrumentation, servers, and the like.

The display 62 may include any type of electronic display such as a liquid crystal display, a light-emitting-diode display, and the like. As such, data acquired via the I/O ports and/or data analyzed by the processor 54 may be presented on the display 62, such that the planning system 50 may present designs for hydrocarbon sites 10 for view. In certain embodiments, the display 62 may be a touch screen display or any other type of display capable of receiving inputs from an operator. Although the planning system 50 is described as including the components presented in FIG. 2, the planning system 50 should not be limited to including the components listed in FIG. 2. Indeed, the planning system 50 may include additional or fewer components than described above.

It should also be noted that for the sake of modularity and flexibility with regard to both the size and specifications of the targeted facility optimization problem, the planning system 50 may be implemented over a web application with back-end and front-end components. In this scheme, the back-end component may be responsible for handling certain optimization algorithms, while the front-end component may be used to set optimization problem specifications and parameters from a user's perspective as detailed further below. The communication between the front-end component and back-end component of the planning system 50 may involve communications over any suitable network.

With the foregoing in mind, the planning system 50 may implement a modular optimization scheme for component placement optimization. Moreover, the planning system 50 may also use an A* searching algorithm for planning the layout of the pipelines 28. By way of example, the planning system 50 may employ the PSO algorithm to increase a convergence time to identifying a suitable set of components and locations for the components in the hydrocarbon site 10, while minimizing an objective function value, such as overall cost, as compared to other planning processes. Moreover, the planning system 50 may apply the A* searching algorithm to determine suitable pipeline layout designs, thereby incorporating the power of heuristic functions to attain an optimal (e.g., cost-efficient, resource-efficient) solution using fewer computing resources and computing time, as compared to other planning processes. By employing the heuristic function to convey with the specifications and constraints applicable to realistic pipeline layout scenarios, the planning system 50 may reduce time accrued in search practices for identifying component locations, thereby reducing the expenditures of computational time and resources.

In some embodiments, the planning system 50 may apply an optimization scheme such as the PSO algorithm to input data in a way to tolerate various features in order to solve practical onshore and offshore hydrocarbon fields' scenarios. That is, the planning system 50 may use the PSO algorithm to solve an optimization problem related to designing the hydrocarbon site 10. By way of example, the optimization problem may correspond to constructing the hydrocarbon site 10 at a threshold cost to produce a threshold amount of hydrocarbons over some period of time. To define the optimization problem or optimization parameters for the optimization problem, the planning system 50 may evaluate the hydrocarbon site 10 according to certain hierarchical or logical layers.

Figure 3:
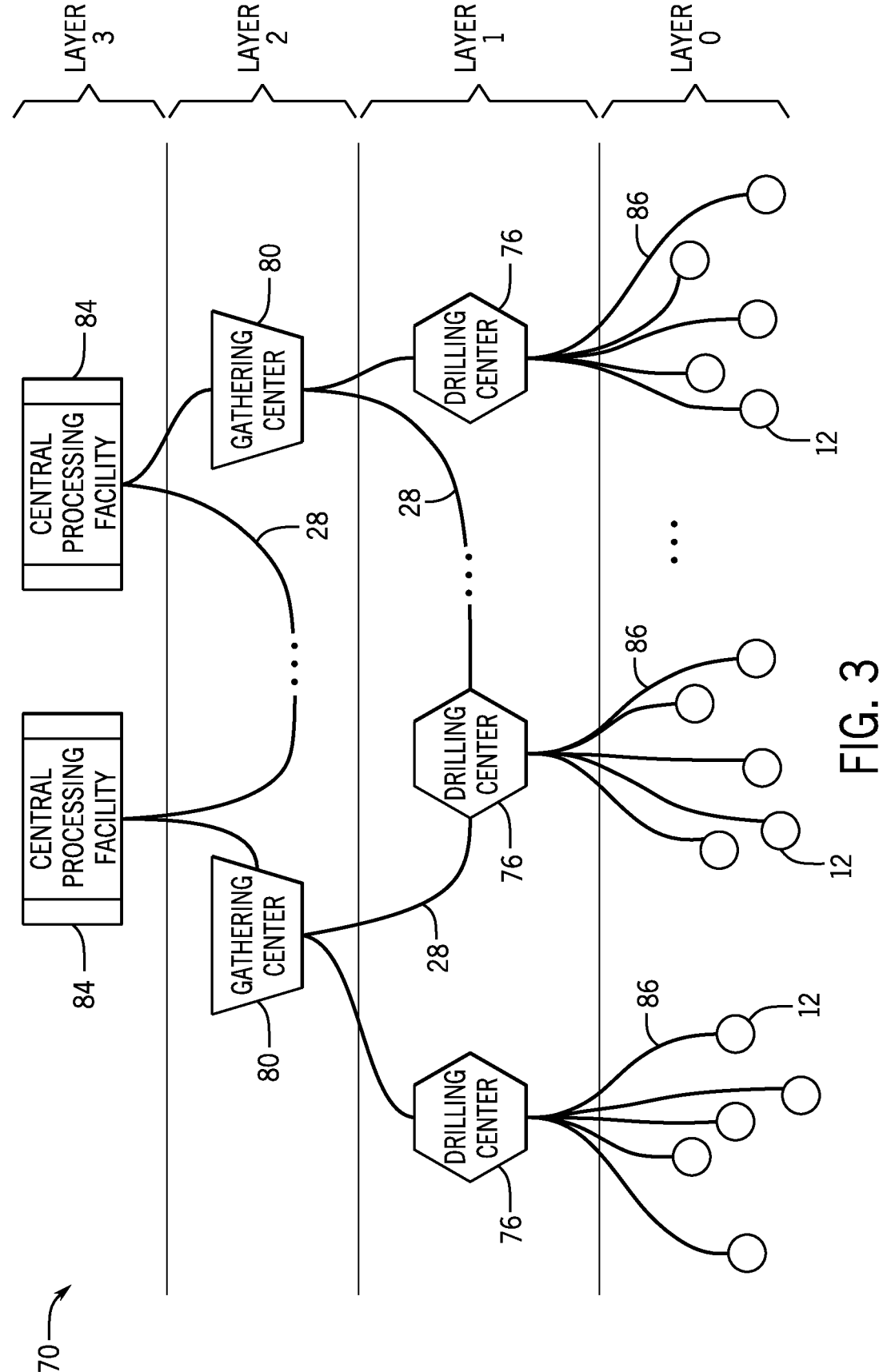
FIG. 3 is a block diagram of logical layers for components that may be part of the hydrocarbon site of FIG. 1, according to one or more embodiments of this disclosure.

For example, FIG. 3 is a block diagram of logical layers 70 for components that may be part of the hydrocarbon site 10. The logical layers 70 may detail different logical groupings of various components that may be part of the hydrocarbon site 10. As such, each layer of the logical layers 70 may include a collection of nodes that perform some similar function. By way of example, referring to FIG. 3, the wells 12 may be nodes that are part of a layer 0. The wells 12 may correspond to locations in which hydrocarbons may be produced. Layer 1 may include drilling centers 76, which may correspond to the drilling platform 16, various types of well devices (e.g., pumpjacks 22, submersible pumps 24, well trees 26) used for extracting the hydrocarbons from the wells 12 in the layer 0. In the same manner, layer 2 may receive output from the drilling centers 76 at gathering centers 80 (e.g., wellhead distribution manifolds 30, separators 32). Layer 3 may be hierarchically positioned above layer 2 and may include central processing facilities 84 (e.g., storage tanks 34) that may collect the outputs of the gathering centers 80. The central processing facilities 84 may, in some embodiments, be positioned within a threshold distance of distribution channels (e.g., transcontinental pipeline, shipyard, highway) to enable the processed hydrocarbons to be transported to a destination site.

As illustrated in FIG. 3, a four-layer facility of the hydrocarbon site 10 with layers 0 to 3 correspond to wells, drilling centers, gathering centers, and central processing facility, respectively. In this way, the logical layers 70 provide an example case of a production system optimization problem that includes $N_l$ ($l=1, \ldots, N_l$) logical layers (e.g., 0, 1, 2, 3), such that each layer contains $N_n^l$ ($i=1, \ldots, N_n^l$) nodes. Layer 0 denotes the wells 12 with $N_n^0=N_w$. Layer 0 is (e.g., horizontal well sections) input to the facility placement optimization problem. Therefore, the planning system 50 may solve an optimization problem presented below starting from layer 1 and above. As should be appreciated, the number of layers may be increased or decreased to add or remove complexity. Furthermore, the planning system 50 may optimize connections between the layers 70, such as pipelines 28 and/or well trajectories 86 simultaneously or separately.

Referring to FIG. 3, the planning system 50 may perform a modular optimization of the number and location of nodes in each logical layer to minimize an overall cost in building the collection of nodes in the hydrocarbon site 10. That is, the production facilities identified by the planning system 50 may be related to a multi-layer tree, in which each layer in this tree denotes one logical layer. As such, the planning system 50 solves an optimization problem that minimizes a total cost for building the facilities or other components that correspond to the nodes based on the logical layers with wells (layer 0), drilling centers (layer 1), gathering centers (layer 2), and central processing facility (layer 3), and the nodes of each logical layer (layer l) that are connected to nodes in an upper layer (layer l+1) through pipelines 28 (e.g., connections). Moreover, the planning system 50 may combine the determined facility placements with the A* searching algorithm to optimize pipeline layouts that connect nodes to another node or other nodes.

Keeping this in mind, optimization parameters that may be used by the planning system 50 to solve the optimization problem may include the following:

(1) Number of nodes, $N_n^l$, in layer l, $l=1, \ldots, N_l$;

(2) Nodes coordinates $X_i^l$, $Y_i^l$, and $Z_i^l$, $i=1, \ldots, N_n^l$;

(3) Number of nodes in layer l−1 connected to each node in layer l;

(4) $C_{ij}^l$: the assignment of node j in layer l−1 to its corresponding node i in layer l, where $$C_{ij}^l = \begin{cases} 0, & \text{if node } j \text{ in layer } l-1 \text{ is not connected to node } i \text{ in layer } l \\ 1, & \text{if node } j \text{ in layer } l-1 \text{ is connected to node } i \text{ in layer } l \end{cases}$$

(5) Pipeline placement; the optimal path connecting two nodes on a given physical layer. Example: pipelines connecting drilling centers to gathering centers. This can be, optionally, simplified so that these pipelines can be replaced by the Euclidean distance between the two nodes. Moreover, the optimal path may be formed of multiple nodes between a starting point and a target point, and optimization may utilize the location of each node on the path.

(6) Well trajectory; the optimal trajectory for a wellbore 18 from the surface to the well location. Further, optimization of well trajectories may include changing control points and/or kick-off points (KOPs).

Based on the logical layers 70 of the hydrocarbon site 10, the planning system 50 may focus on minimizing a well-defined objective function for facility optimization: TC, which represents a facility total cost ($) combining the various nodes costs as well as the corresponding connections costs. An example optimization problem that may be defined for the planning system 50 is provided below in Equation (1).

$$TC = \Sigma_{l=1}^{Nl} [(C_n^l \times N_a^l) + (C_c^l \times TD_a^l)] \tag{1}$$

Referring to Equation (1), $N_a^l$ and $TD_a^l$ may denote the actual number of nodes in layer 1 ($N_a^l \leq N_n^l$) and a total distance from nodes in layer l−1 to nodes in layer/(m), respectively. That is, $TD_a^l$ is the sum of all the connections length (m) from nodes in layer l−1 to nodes in layer 1.

As may be appreciated, a tradeoff may exist between the facility placement costs (e.g., chosen nodes costs) and the drilling costs (e.g., pipelines connecting the various hierarchical layers of the hydrocarbon site 10), where the goal is to reach an optimal solution that minimizes a total facility cost. In addition to the optimization problem detailed above, the planning system 50 may be limited to identifying solutions based on certain constraints. For example, a list of a set of constraints of the above optimization problem, for each layer l, $l=1, \ldots, N_l$ may include the following:

(1) Maximum allowed $N_a^l$. $N_{actual}^l \leq N_n^l$ (2) Maximum capacity of each node in each corresponding layer $N_c^l$: $N_c^l \leq N_n^l$ (3) Non-negativity for $N_a^l$ and $TD_a^l$.

(4) Connections maximum length in layer l.

Before describing details regarding implementing the optimization algorithm to identify locations for components in the hydrocarbon site 10, it should be noted that the planning system 50 may or may not analyze certain components of the hydrocarbon site simultaneously. In general, after a hydrocarbon site 10 location is identified through subsurface studies, the design of the production system becomes an optimization problem with respect to time and costs. Aspects of the production system change from onshore to offshore fields and include for an offshore field. For instance, the decision about the number of platforms, placement and sizing the platforms, and wells-platform assignment are variables that may be evaluated in the optimization problem. Throughout the field development planning exercise, including the early phase during which the development concept is selected, various development models may be taken into consideration and may involve careful evaluation for their economic viability and technical feasibility. Over this screening stage, the planning system 50 may implement an iterative workflow where various scenarios of facility development optimization are evaluated considering the core high-level costing and potential surface limitations. As a result, the planning system 50 may implement a highly efficient facility placement optimization scheme that accommodates topological complexities and surface constraints (e.g., prohibited areas) as described below. Furthermore, the efficiency of the optimization scheme may be variable.

Figure 4:
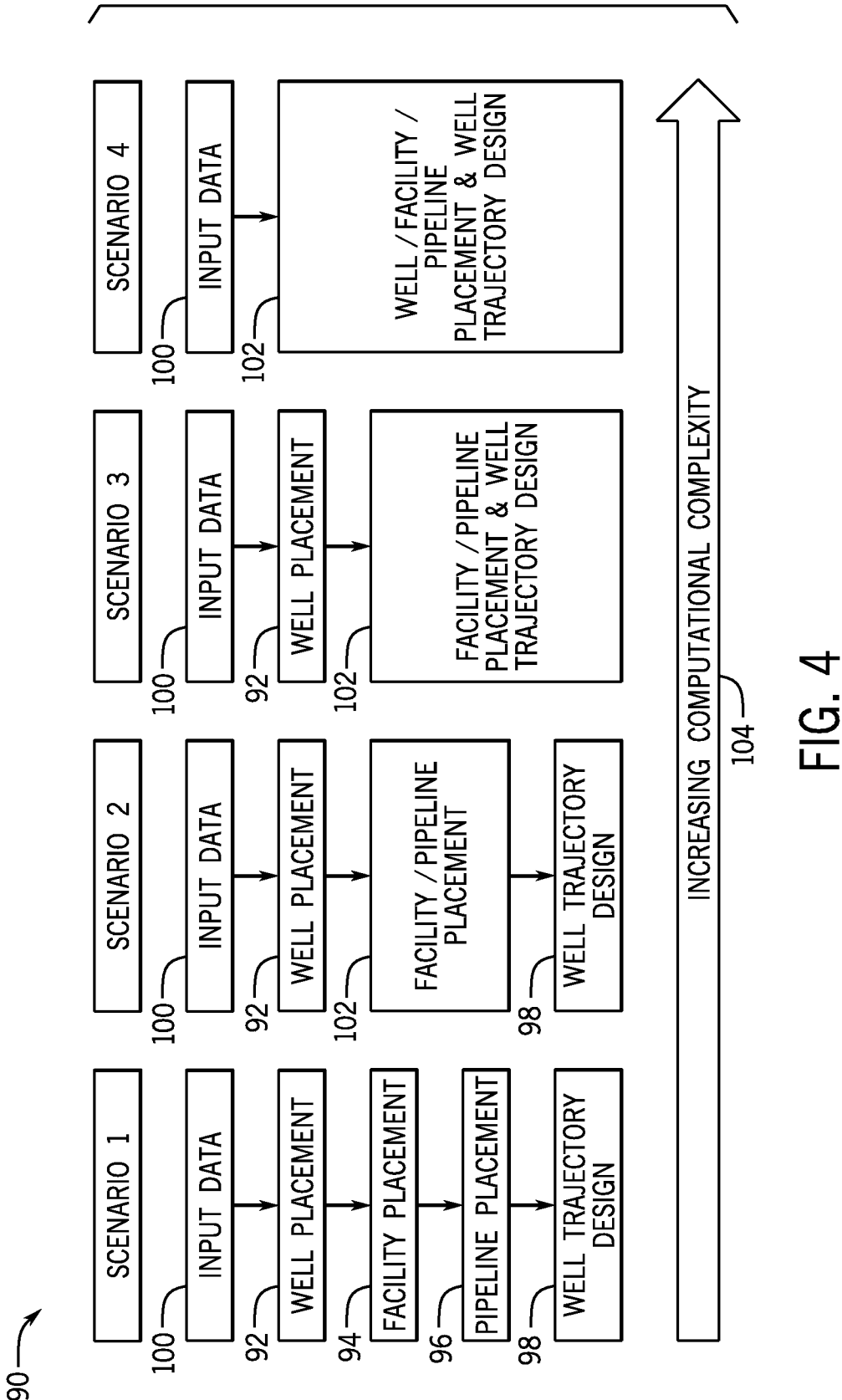
FIG. 4 is a block diagram of example analysis scenarios that a hydrocarbon planning system may utilize when formulating possible layouts for a hydrocarbon site, according to one or more embodiments of this disclosure.

To help illustrate, FIG. 4 is a block diagram of example analysis scenarios 90 that the planning system 50 may utilize when formulating optimal layouts for a suitable hydrocarbon site (e.g., hydrocarbon site 10). In Scenario 1, each set of well placements 92, facility placements 94, pipeline placements 96, and well trajectory designs 98 are determined separately based on input data 100 and a previously performed analysis. In other words, the optimization of each component is independently determined based on the input data 100 and any other analysis performed prior to the respective optimization analysis. Indeed, while the location or selection of certain components may be related to that of other components (e.g., pipeline placements are dependent upon facility locations), independent analysis, as referred to herein, corresponds to performing analysis without simultaneous consideration. Scenarios 2-4 include a simultaneous analysis 102 of multiple different components. For example, Scenario 2 includes a simultaneous analysis 102 of facility placements 94 and pipeline placements 96, Scenario 3 includes a simultaneous analysis 102 of facility placements 94, pipeline placements 96, and well trajectory designs 98, and Scenario 4 includes a simultaneous analysis 102 of well placement 95, facility placements 94, pipeline placements 96, and trajectory designs 98. Additionally, the computational complexity 104 increases with more integrated simultaneous analyses 102. As such, in some embodiments, the planning system 50 may select a scenario 90 to achieve an optimal solution of components within a specified (e.g., user specified) computational resource parameter or time constraint. Furthermore, one or more user preferences or selections may set a priority (e.g., on a continuous or discrete scale) between a computation efficiency and an accuracy of optimization. In addition, the planning system 50 may receive a user selection for a maximum cost value for a particular hydrocarbon site 10 and the planning system 50 may select an appropriate scenario 90 based on the maximum cost value. That is, to find lower cost solutions, the planning system 50 may select a scenario 90 that has higher computational complexities. Further, while each of the above scenarios 90 (e.g., Scenarios 1-4) are discussed in further detail below, as should be appreciated, the simultaneous analysis 102 may include any subset of the components of the hydrocarbon site 10 and may be performed in a variety of suitable orders.

Furthermore, while present techniques utilize the an optimization algorithm such as PSO to select and/or place the components of the hydrocarbon site 10, including the simultaneous analysis 102, independently analyzed components may use a separate (e.g., independent) PSO algorithm or other analysis techniques. For example, other techniques may be used to identify well placement or well trajectory separate from facility placement and/or pipeline placement. For example, a well placement algorithm may use a net hydrocarbon thickness map to place wells using a black hole algorithm. Furthermore, even if well placement and well trajectory are not provided as outputs by the planning system 50, this does not significantly impact the purpose of facility design (e.g., identification and placement of components in the hydrocarbon site 10).

Figure 5:
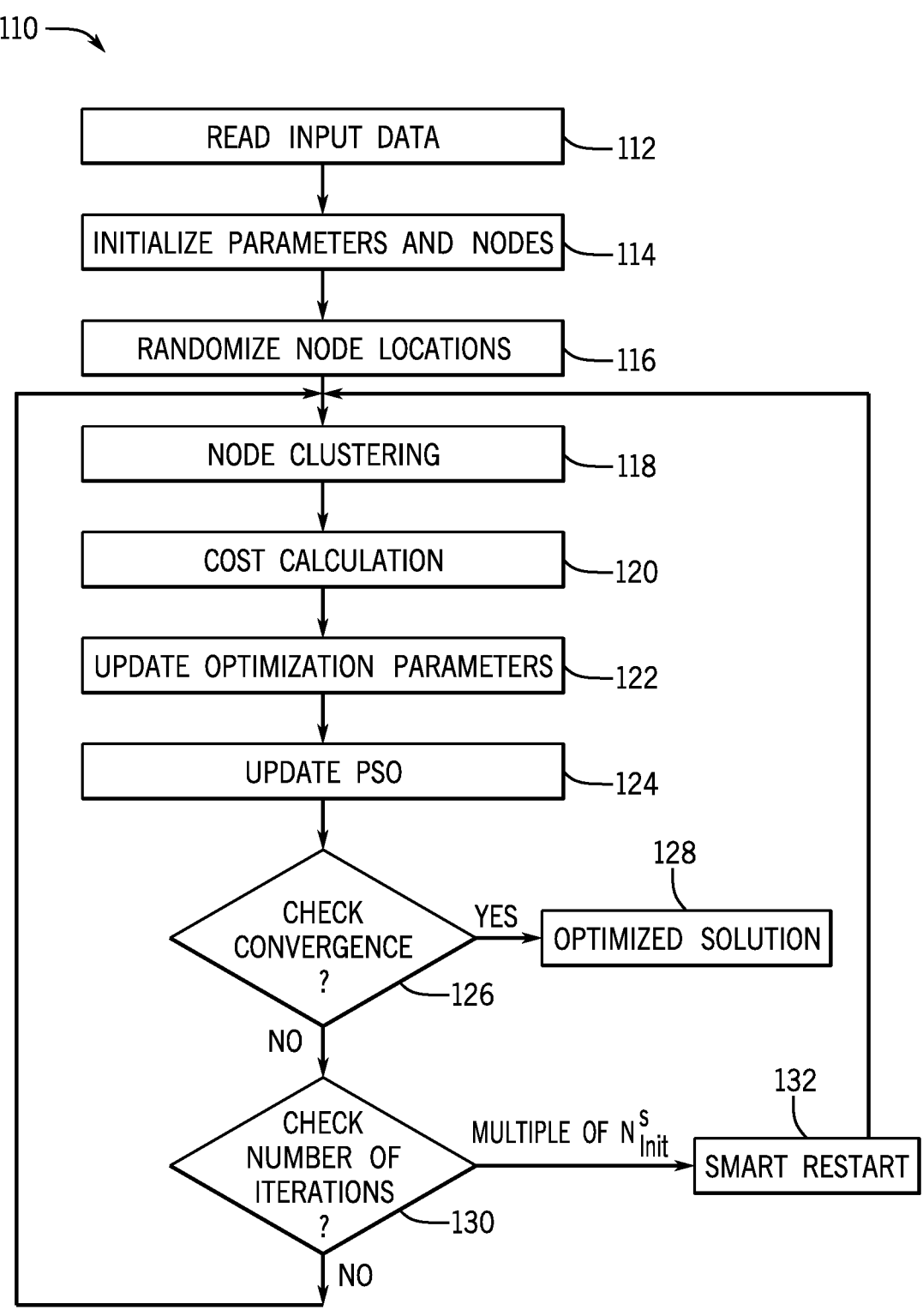
FIG. 5 is a flow diagram of an example method for identifying components for a hydrocarbon site and suitable locations for the components, according to one or more embodiments of this disclosure.

In some embodiments, the planning system 50 may employ a PSO algorithm for identifying locations for components in the hydrocarbon site 10. FIG. 5 illustrates a method 110 for performing the optimization operations. As should be appreciated, other optimization algorithms may be used in place of the PSO algorithm. Although the following description of the method 110 is described as being performed by the planning system 50, it should be understood that any suitable computing system may perform the method 110. Additionally, although the method 110 is described in a particular order, it should be noted that the method 110 may be performed in any suitable order.

As mentioned above, the planning system 50 may be implemented over a web application with back-end and front-end components. In this scheme, the back-end component may be responsible of handling certain optimization algorithms, while the front-end component may be used to set optimization problem specifications and parameters from a user's perspective as will be detailed below. The communication between the front-end component and back-end component of the planning system 50 may involve communications over any suitable network.

Referring to FIG. 5, at block 112, the planning system 50 may read input data 100 related to the hydrocarbon site 10 in which the components may be placed. The input data 100, in some embodiments, may include map data representative of a number of physical layers associated with an area expected to be used as the hydrocarbon site 10. The input data 100 may also include logical layer data representative of various logical layers in which different sets of components may perform different operations within the hydrocarbon site 10. Furthermore, the input data 100 may include any geographical, topological, subterranean, and/or subsea mapping, dataset, or cost estimation to facilitate analysis of well placement 92, facility placement 94, pipeline placement 96, and/or well trajectory design 98. In some embodiments, including embodiments with independent analyses, the input data 100 may also include sets of coordinates for the wells 12 or other independently analyzed components at the hydrocarbon site 10 as well as cost data for the components planned to be deployed at the hydrocarbon site 10.

By way of example, the input data 100 may include map data. The map data may include structured topological maps that correspond to the hydrocarbon site 10 on which component placement optimization may be applied. The map may include a union of quadrate cells, and each of these cells may be composed of four nodes. The map may integrate or define prohibited areas where components (e.g., facility nodes) are prohibited from being placed and where pipelines cannot pass-through. In some embodiments, the planning system 50 may apply a penalty to the prohibited areas to avoid them as much as possible, and thus reduce the corresponding cost. In some embodiments, the map data may include gridded topological maps, such as structured maps that are composed of quadrilateral grid blocks. Another map, such as triangular net, may also be used to possibly permit improvement in distinctive topological complexities.

The input data may also include well data. The well data may include coordinates (e.g., $X_i^0$, $Y_i^0$, and $Z_i^0$, i=1, . . . , $N_n^0$) that may define the well's entry point in the reservoir for vertical/deviated wells and wells' toe or heel in the case of horizontal wells. In some embodiments, the planning system 50 may determine the toe/heel locations to minimize the well's total depth.

The input data may also include a number of facility layers, a maximum (e.g., upper limit) number of nodes in a layer, a capacity of nodes in a layer, a maximum connection length in a layer, a cost of a node in a layer, a cost of a connection per distance from nodes in a layer, and the like. A list of the variables that correspond to these input data types is provided below:

$N_l$ Number of facility layers.

$N_n^l$ Maximum (upper limit) number of nodes in layer l.

$N_c^l$ Capacity of nodes in layer l. That is, the maximum number of nodes in layer l−1 that can be connected to a node in layer l.

$TD_c^l$ Connections maximum length in layer l(m). This is mainly used to account for the well's total depth constraint.

$C_n^l$ Cost of node in layer l ($/node).

$C_c^l$ Cost of connection/meter from nodes in layer l−1 to nodes in layer l ($/m).

In some embodiments, the planning system may receive the input data via the communication component 52, the I/O ports 60, or the like. For example, the planning system 50 may include a developed front-end web application that communicates with the back-end optimizer through a public internet protocol and specific port numbers in a way to facilitate the user engagement. The planning system 50 may implement this scheme through an interface where the user enters the number of logical layers (e.g., manifolds, platforms, floating production storage and offloading (FPSO), onshore facility) of the facility optimization problem along with maps representing the physical layers corresponding to each of these logical layers. Moreover, the user may provide the input parameters pertaining to each logical layer l, =1, . . . , $N_l$: $N_n^l$, $N_c^l$, $C_n^l$ and $C_c^l$ mentioned above. The input parameters specific to a facility optimization problem may be dispatched together from the front-end application placed at the user's machine to the back-end machine via the communication component 52 (e.g., TCP/IP tunnel).

At block 114, the planning system 50 may initialize parameters and nodes for the hydrocarbon site 10. In some embodiments, the input parameters may be entered by a user through the front-end of the planning system 50, which may forward the data to the back-end of the planning system 50, which may execute computer-readable instructions that implement an optimizer application such as a PSO application. The optimizer application may then use the input parameters (e.g., input data) to initialize the optimization problem, which may then be solved by the optimizer application. By way of example, a PSO application may use $N_{PSO}^P=100$ particles with a maximum number of iterations $N_{PSO}^{It}=1000$. In any case, at block 114, the planning system 50 focuses on initializing a set of "candidate solutions" that satisfy the problem constraints. A candidate solution may thus be composed of a set of logical layers annotated by LL where each layer ($LL_l$) is composed of a set of logical nodes ($LN_l$).

At block 116, the planning system 50 may randomize node locations for the candidate solutions that it initialized in block 114. Initially, the planning system 50 may randomly place nodes of each logical layer within a corresponding map. The random distribution may account for collision avoidance and uniform (e.g., unbiased) distribution of the nodes. That is, the planning system 50 may account for collision avoidance between nodes by randomly placing nodes in the grid cells while ensuring that no more than one node can be placed in a given grid cell. Each node is thus initialized by being assigned a specific grid cell on the map, and the respective grid cell corresponds to the location where the node is constructed. An example of a candidate solution is illustrated in FIG. 6.

After randomizing the node locations, the planning system 50 may, at block 118, start an iterative process for clustering nodes. In some embodiments, the planning system 50 may group nodes in layer 1 and cluster the nodes to nodes in layer l+1 in a way to minimize the corresponding cost in terms of used nodes. The clustering of nodes may depend on the corresponding nodes' capacities and a distance between the nodes in layers 1 and l+1. In some embodiments, a bottom-up approach may be used that starts by clustering nodes in the lowest layer (l=0) and connecting them to a number of nodes in layer l=1. Then, the same clustering method may be used to cluster nodes in layers=1, . . . , $N_{L-1}$. Additional details regarding the clustering process will be discussed below with reference to FIG. 7.

At block 120, the planning system 50 may perform a cost calculation for the set of candidate solutions determined after block 118. That is, the planning system 50 may evaluate each candidate solution with respect to a cost function. The cost function calculates a total cost of building a facility using the given configuration specified by the candidate solution. The clustering algorithm may thus use a set number of nodes to make connections that minimize total cost. The total cost of the facility may then be determined based on a sum of costs of all nodes in the set of candidate solutions added to the sum of costs of connections constructed among them. By way of example, the total cost of the proposed solution is calculated using Equation (2):

$$\text{Total Cost} = \sum_{i_n=0}^{N_n^T} \text{Node Cost}_{i_n} + \sum_{i_c=0}^{N_c^T} \text{Connection Cost}_{i_c} \qquad (2)$$

Referring to Equation (2) above, $N_n^T$ and $N_c^T$ denote a total number of nodes and connections, respectively. Node cost corresponds to an expected cost of a node in each layer as specified at the start. However, only nodes that are part of the final facility model are included in the total cost calculation (i.e., not the maximum number of nodes in the initialized solution). Connection cost corresponds to a cost for building a connection between two nodes. Connections may be well trajectories 86 (e.g., from layer 0 to layer 1) or pipelines 28/flowlines (e.g., when connecting upper layers). In each of the two cases, a different methodology may be used to model and accurately assess the cost of building the connection.

In some embodiments, the planning system may employ an option to use a simplified and drastically faster version of well and pipelines trajectory for a more efficient but less accurate solution. In this approach, the planning system 50 may assume that trajectories are straight lines (e.g., Euclidean distance) and their cost is simply calculated using Equation (3).

Connection Cost=Connection Length×Connection
Cost per Meter                                    (3)

For more realistic and, consequently, more accurate results, the planning system 50 may employ an A*search algorithm, discussed further below, to optimize a pipeline layout. This approach provides more realistic modeling for the pipelines and, hence, a much more reliable cost estimation based on the topology of the surface, the effect of pressure on pipelines construction, and any additional cost modifications implied by the surface.

At block 122, the planning system 50 may update optimization parameters used to solve the optimization problem. That is, the cost may be considered as a minimal cost that can be reached for the optimization problem at a specific iteration. As such, the determined nodes' numbers and positions in each logical layer, as well as the clustering/grouping of these nodes, may be saved in the storage component 58 and considered to be a temporary optimal set of candidate solutions prior to applying the PSO algorithm or performing the PSO process. These nodes' positions, as well as the determined cost, may then be used for the PSO particles initialization for the following iteration, thereby applying a developed smart restart scheme.

At block 124, the planning system 50 may update the optimization algorithm (e.g., PSO algorithm). The PSO algorithm is an evolutionary iterative algorithm, such that each of the $N_{PSO}^P$ particles symbolizes a solution of the corresponding objective function and the "swarm" represents the particles group evolved in the optimization scheme. As such, earlier iteration results are used to establish velocity parameters used then to determine a position of each particle in the search space. The preceding particle velocity is mathematically formulated to update the velocity parameter of the corresponding particle. This mathematical formulation uses the particle's former velocity (e.g., from the previous PSO iteration), corresponding distance to the particle that attained the global best and corresponding distance to its own local best attained at any PSO iteration. In this way, each of the $N_{PSO}^P$ particles may store an optimal position or "solution" it achieves all over the optimization process (e.g., local best). On the other hand, the algorithm similarly stores the optimal position achieved by any of its particles (e.g., global best). A similar logical flow may be used by replacing PSO with a different optimizer.

At block 126, the planning system 50 may check the convergence of the candidate solutions. If the cost of the best-case particle (e.g., lowest cost) and that of the average case are less than a prescribed tolerance (e.g., 1%, 5%, or user selected tolerance), the planning system 50 may declare that a convergence is detected and proceed to block 128. At block 128, the planning system 50 may adopt the best-case particle (e.g., lowest cost) results as the optimal solution for the for the facility optimization problem. In some embodiments, the planning system 50 may then present the results for the identified components on a mapped visualization for a user to view. That is, the planning system 50 may present the components at the identified locations of a map, which may have been received via the input data 100. The locations may be presented with the map as a visualization depicted via the display 62 or any suitable electronic display. In some embodiments, the data corresponding the locations of the components, the generated visualization, and the like may be stored in a computer-accessible file, which may be transmitted to other computing devices or stored in a cloud-storage component for other users to access and evaluate.

In case either the best-case particle cost or the average case cost is above the tolerance, the planning system 50 may perform another iteration and proceed to block 130. At block 130, the planning system 50 may determine whether a convergence has been reached within a predefined $N_{Init}^s$ threshold. If the predefined threshold has not been met, the planning system 50 may return to block 118. However, if the predefined threshold has been met, the PSO algorithm may be struggling to reach the optimal solution. In such a case, the planning system may proceed to block 132.

For the purpose of avoiding sticking into a local optimum as typically encountered with gradient-free algorithms, the planning system 50 may, at block 132, perform a smart restart scheme. The smart restart scheme may augment the PSO algorithm to empower and motivate the update of the particles in the search space. This smart restart works in a way that it passes the best particle result into all the particles every 50 iterations. As a result, the update boosts the search effort done by the different particles and saves of the time and number of iterations to reach convergence.

As mentioned above with respect to block 118, FIG. 7 illustrates a method 140 for performing the clustering operation described in the method 110. Like the method 110, the following description of the method 140 is described as being performed by the planning system 50. However, it should be understood that any suitable computing system may perform the method 140. Additionally, although the method 140 is described in a particular order, it should be noted that the method 110 may be performed in any suitable order.

As will be described below, clustering the nodes together may involve an iterative process that groups nodes in logical layer l to the appropriate nodes in layer l+1, l=0, ..., $N_l$–1, accounting for the capacity of the corresponding nodes. As such, the clustering process may be performed sequentially starting from the lower layer up to the upper layer, starting with layer l=0 and moving upward. Upon getting the appropriate cluster, the clustering algorithm updates the PSO optimizer algorithm with these clusters, and the PSO optimizer algorithm (e.g., application executed via the planning system 50) may be updated with the number of nodes in each layer. Nodes with empty cluster lists may not be used in determining the total cost calculation.

Figure 7:
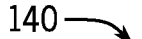
FIG. 7 is a flow diagram of an example method for clustering or grouping sets of components to determine suitable locations for the components of the hydrocarbon site, according to one or more embodiments of this disclosure.

Referring now to FIG. 7, at block 142, the planning system 50 may initialize a clustering algorithm being executed by receiving data related to nodes in a particular layer l. The layer l may be received via user input or may be identified as the lowest value of each of the layers l.

At block 144, the planning system 50 may calculate Euclidean Distance between each node in a particular layer l and nodes in an adjacent layer l+1. Here, the planning system 50 may calculate the Euclidean distance from each of the nodes in layer l to all the nodes in layer l+1 and store the results in a distance matrix.

At block 146, the planning system 50 may rank the calculated distances between the nodes of the adjacent layers. That is, after populating the distance matrix and before assigning the appropriate clusters, the planning system 50 may rank the distance for each node's row in layer l to all the nodes in layer l+1 in ascending order to facilitate and prepare for groups formation.

At block 148, the planning system 50 may assign nodes to the certain clusters. After ranking the distance matrix, the planning system 50 may group each node in layer l into the appropriate node (e.g., cluster) of layer l+1. If the nearest node in layer l+1 has no capacity to include a respective node, the planning system 50 may consider the next node in layer l+1 (e.g., the second near node) until the node in layer l is grouped into a node in layer l+1.

At block 150, the planning system 50 may update the cluster list being generated at block 146. Indeed, each time a node in layer l+1 is assigned a new node from layer/into its group/cluster (as described in the previous step), the planning system 50 may update the corresponding node's cluster list and reduce the available capacity of this node by 1.

At block 152, the planning system 50 may iteratively check each layer l. That is, the planning system 50 may check the different layers of the logical layers 70 for the proposed hydrocarbon site 10 to determine whether each layer l has been considered within the clustering scheme. If each layer l has not been considered, the planning system 50 may continue to block 154 and move to evaluate the next layer l+1. As such, the planning system 50 may then return to block 144 and perform the method 140 for the next layer l+1. However, if the planning system 50 has checked each layer of the logical layers 70, the planning system 50 may finalize the clustering to include the grouped nodes identified using the method 140 and pass the finalized results to the PSO optimizer algorithm to continue the optimization process. The planning system 50 may store the clustered nodes in the storage component 58 (or any other suitable storage), such that the clustered nodes may be processed at block 120.

By employing the map-based algorithm proposed in the methods above, the planning system 50 may have several competitive-advantages over other planning operations. For example, the present embodiments address topological complexities (e.g., valleys and mountains), accounts for prohibited areas (e.g., conservation areas and private land fields) and supports flexibility of having different logical layers (e.g. wells, drilling centers, gathering centers, central processing facility) on different physical layers (different maps with different elevations and constraints). Additionally, with respect to handling cost variations, the present embodiments may include considering diverse cost-based maps in the modeling course to characterize different possible costs added for the applied facility placement optimization, which may be integrated with the corresponding A* search algorithm for the pipeline planning scheme. The map may be similarly changed into the corresponding cost graph, as discussed below, to precisely approximate the cost of the corresponding facility system.

Additionally, the present embodiments described above may be employed to optimize platforms' locations and the wells to platforms connections, which corresponds to control variable costs in field development planning in terms of both drilling cost and enhanced hydrocarbon recovery. That is, the optimization problem solved above includes an objective function based on the cumulative well-platform distance, hence minimizing total well tubing, risers, and pipelines length. As a result, the present embodiments may include minimizing the drilling cost and investment related to the distances, as well as enhancing the productivity of the reservoir. That is, the productivity of wells and hence of the reservoir is affected by the well tubing, risers, and pipelines length through the associated hydrostatic pressure drop in the production system. Consequently, for a given pipeline slope, the shorter the distances, the lower the pressure drop, and hence the higher the well productivity. On the other hand, steep pipelines undergo significant flow assurance issues which result in high wellhead pressure limits and, hence, reduced well productivity. Each of these factors may be accounted for using the techniques described above via the cost data associated with each piece of equipment and the evaluation operations described above.

Keeping the foregoing in mind, the present embodiments described above hold distinct advantages over other planning methodologies. Indeed, other solutions for field development optimization may be divided into two categories: 1) gradient-based (e.g., Conjugate gradient, Newton's, and steepest descent methods), which require computation of the gradient of the objective function and 2) stochastic gradient-free such as particle swarm optimization (PSO), simulated annealing and genetic algorithm (GA). Gradient-based methods are not commonly used in field development planning optimization problems due to their need to be continuously differentiable, which is not characteristic of non-smooth problems such as well and platform placement problems.

Gradient-free methods, however, have been used by various optimization schemes in oil and gas applications. For example, stochastic algorithms acquire their robustness of overcoming premature converging (local optima) from their inherent randomness. Another feature of these methods is their capability to address a wide range of optimization problems irrespective of their complexity. Stochastic optimization methods can be simply modified, tuned, and assisted by other optimizers to enhance their performance, thus work in a hybrid manner.

Other techniques such as a hybrid evolutionary optimization scheme, the black hole particle swarm optimization (BHPSO) technique, techniques that combine both simulated annealing algorithms for facility layout optimization and fuzzy theory for linguistic patterns, and the like lack the computational efficiency of the techniques described herein. That is, the other methodologies identify solutions using more time and processing power as compared to the techniques described herein.

Moreover, the presently disclosed techniques provide improved analysis over other techniques that do not account for different topological complexities (e.g., valleys, mountains, faults). In addition, the other techniques do not account for obstacles avoidance including prohibited areas and environmentally sensitive regions (e.g., conservation areas, private land fields, rivers).

In this regard, the A* scheme may be utilized with the PSO algorithm to take such topological complexities into account when determining pipeline placement 96. As described above, in some embodiments, the planning system 50 may assume that well trajectories 86 or pipelines 28 are straight lines (e.g., Euclidean distance), which may increase the speed of computation but reduce accuracy of the objective function. Alternatively, the presently disclosed embodiments present a modular PSO-based scheme for component placement optimization that may be integrated with the innovative A* scheme for pipeline layout planning. The PSO algorithm may provide superior results in terms of both 1) convergence time and 2) objective function value. Moreover, employing the A* search algorithm for pipeline placement 96 incorporates the power of heuristic functions to attain an optimal solution using the shortest possible time. This embraced heuristic function convey with the specifications and constraints applicable to realistic pipeline layout scenarios to smooth the search practice and, hence, reduces the necessary computational-time while accounting for topological complexities.

Figure 8:
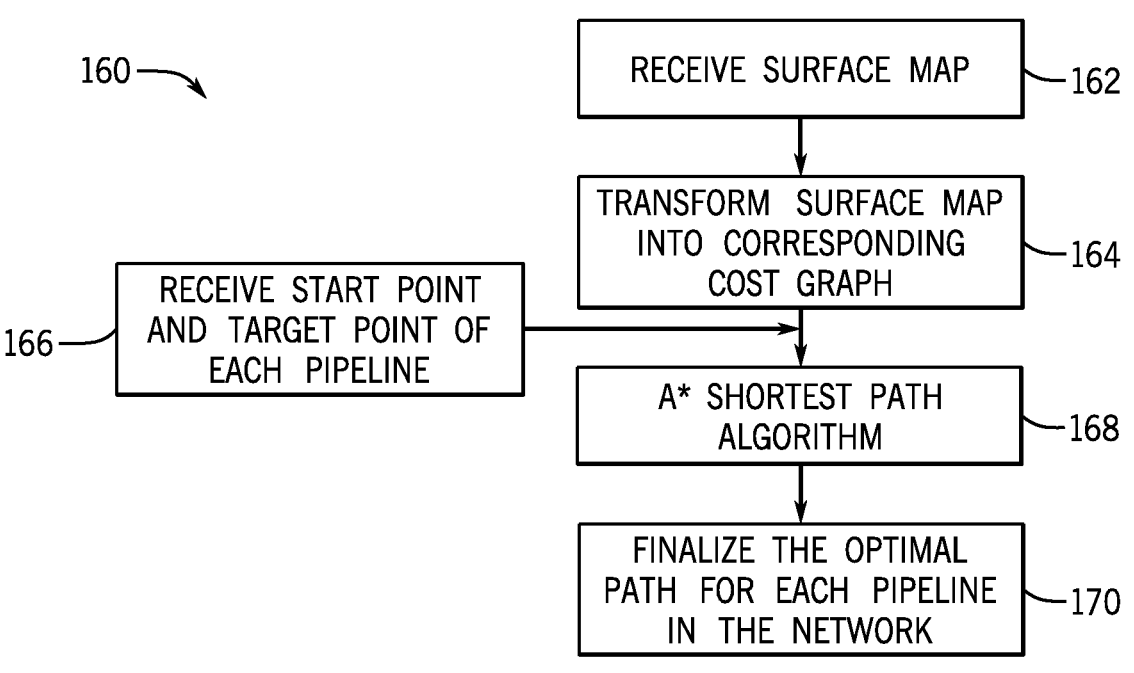
FIG. 8 is a flow diagram of an example method of utilizing a map-based scheme for determining a route for pipelines of a hydrocarbon site, according to one or more embodiments of this disclosure.

Topological complexity and prohibited areas/obstacles avoidance may be accounted for through a map-based approach. To help illustrate the A* algorithm, FIG. 8 is an example method 160 of utilizing a map-based scheme for determining the optimized route for pipelines 28 of a hydrocarbon site 10. In some embodiments, pipeline planning and placement can be represented as a path planning problem taking into account the topology of the surroundings. Although the following description of the method 160 is described as being performed by the planning system 50, it should be understood that any suitable computing system may perform the method 160. Additionally, although the method 160 is described in a particular order, it should be noted that the method 160 may be performed in any suitable order.

Referring now to FIG. 8, at block 162, the planning system 50 may receive one or more surface maps, such that the planning system 50 may analyze the terrain. The surface maps may include topological or geographic maps that include data related to terrain or geological features that are present within an area in which the placement of pipelines is being considered.

At block 164, the planning system 50 may transform the surface map into a corresponding cost graph. The cost graph may assign resource costs for placing pipelines 28 in certain areas due to the terrain. In some embodiments, the resource costs may be stored in a database or database structure that may be organized based on various geological or terrain features that may be present in the surface maps. These costs may be defined within the databases based on previous hydrocarbon site cost data or estimated based on construction costs associated with a particular terrain or geographic layout (e.g., cost to build per square foot in various terrains).

At block 166, the planning system 50 may receive the start point and target point for the pipelines 28 via user input. At block 168, the planning system 50 may calculate the shortest A* path. The planning system 50 may determine the shortest A* path, which may correspond to the shortest path between the start point and the target point while accounting for the cost graph that corresponds to building the pipeline in the respective area. Additional details with regard to utilizing the A* algorithm in accordance with the embodiments described herein will be discussed further below with respect to FIG. 12.

Figure 9:
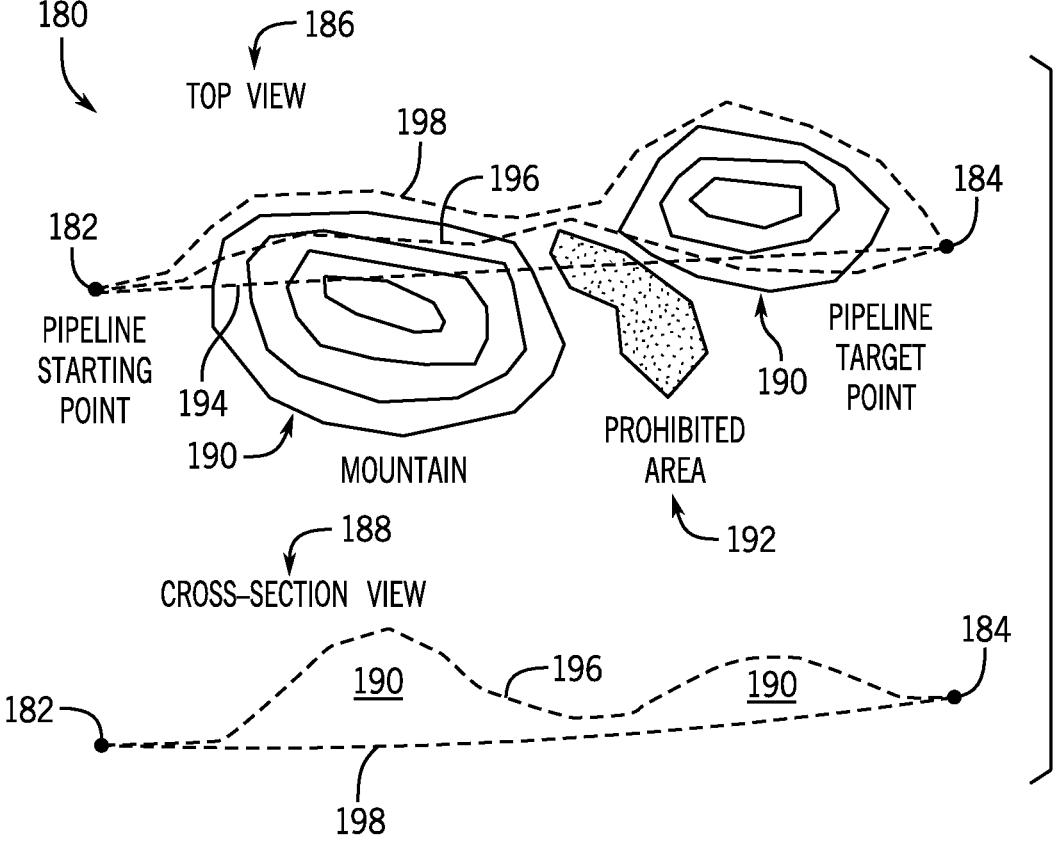
FIG. 9 is an example topology having a pipeline starting point and a pipeline target point, according to one or more embodiments of this disclosure.

In some embodiments, the surface maps may include structured maps made of quadrilateral grid blocks (e.g., mesh) that may define the topological parameters for respective portions of the surface maps. These structured maps may then be used to determine cost graph maps, from which the pipeline placements 96 may be made. Other mesh, such as a triangular mesh, can be similarly adopted to potentially enable refinement in special topologically complex areas. For example, in areas with relatively small passage ways or highly variable terrain compared to the grid size, different or smaller mesh components may be utilized. Furthermore, in some embodiments, the resolution of the planned pipelines 28 may be dependent on the resolution of the initial map. For example, maps with lower resolution may result in pipelines with lower resolution and/or longer segments. To help illustrate, FIG. 9 is an example topology 180 having a pipeline starting point 182 and a pipeline target point 184. From the top view 186 and the cross-sectional view 188 of the topology 180, terrain 190 (e.g., a mountain or hill) and a prohibited area 192 (e.g., body of water) are exampled.

Figure 10:
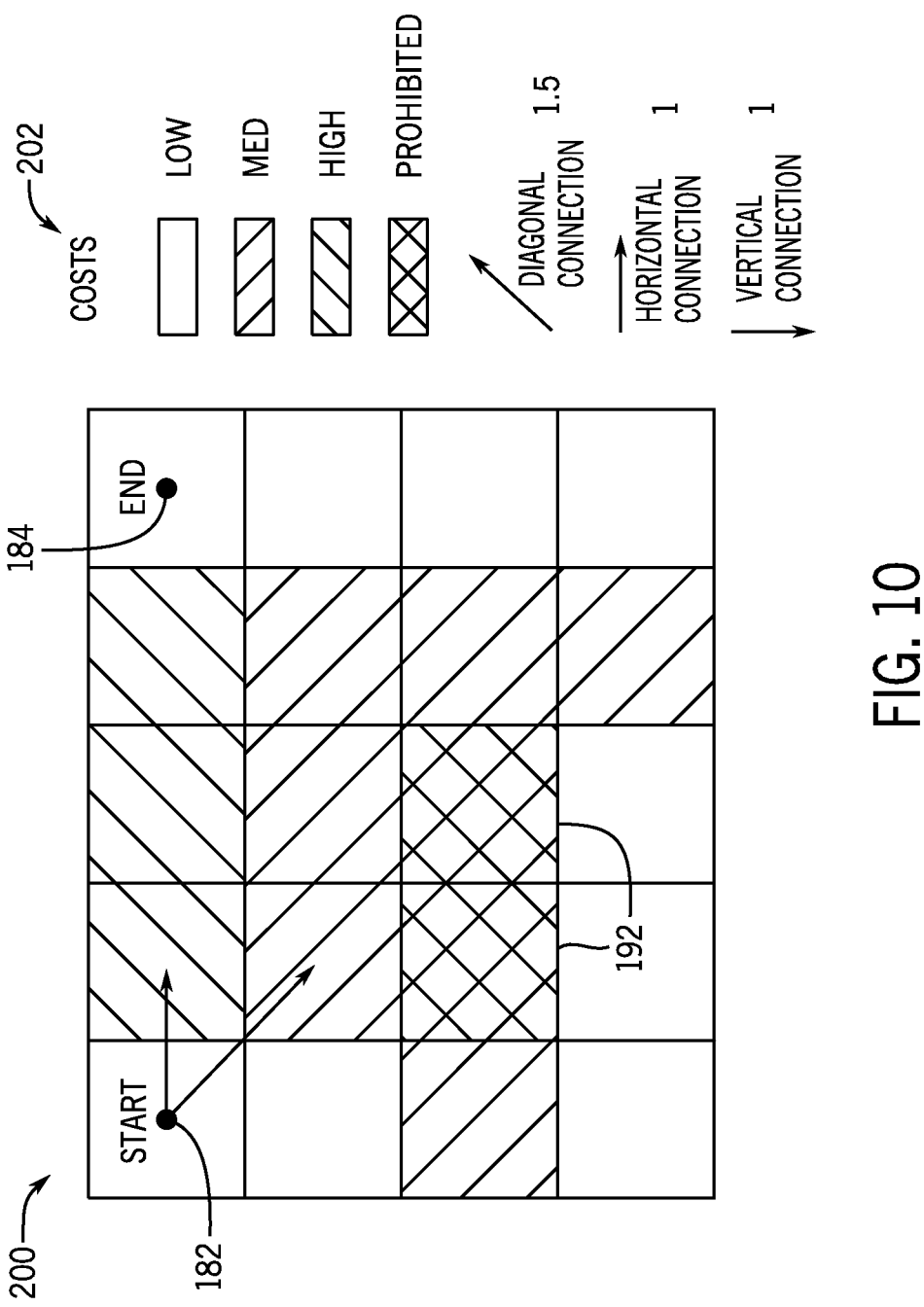
FIG. 10 is a gridded map associating costs with different topological regions, according to one or more embodiments of this disclosure.

Additionally, a Euclidean path 194 (e.g., straight path), a first candidate path 196, and a second candidate path 198 are depicted. As discussed above, the Euclidean path 194 may not take into account prohibited areas 192 or terrain 190 and, therefore, may not be feasible economically or physically. Furthermore, candidate paths 196, 198 may be evaluated based on a map of costs associated with the terrain 190 and/or prohibited areas 192. For example, a map 200, as in FIG. 10, may be utilized to associate costs 202 with different topological regions. As should be appreciated, the costs may correspond to any cost associated with placing pipeline 28 in the respective areas and may include costs to buy the land, build the pipeline 28, maintain the pipeline 28, and the like. As discussed above, the mesh may be broken down into quadrilateral blocks for expedited computation. Moreover, each block of the mesh may have an associated cost 202 that varies based on properties of the terrain 190. Moreover, different pipeline directions (e.g., horizontal, vertical, or diagonal) may also have varied costs associated with them such as due to supplemental equipment that may be used to pump fluids within the pipeline 28. For example, diagonal connections may have an additional or multiplier cost 202 greater than horizontal connections, such as due to extra pipe length, turns, pumps, etc.

Figure 11:
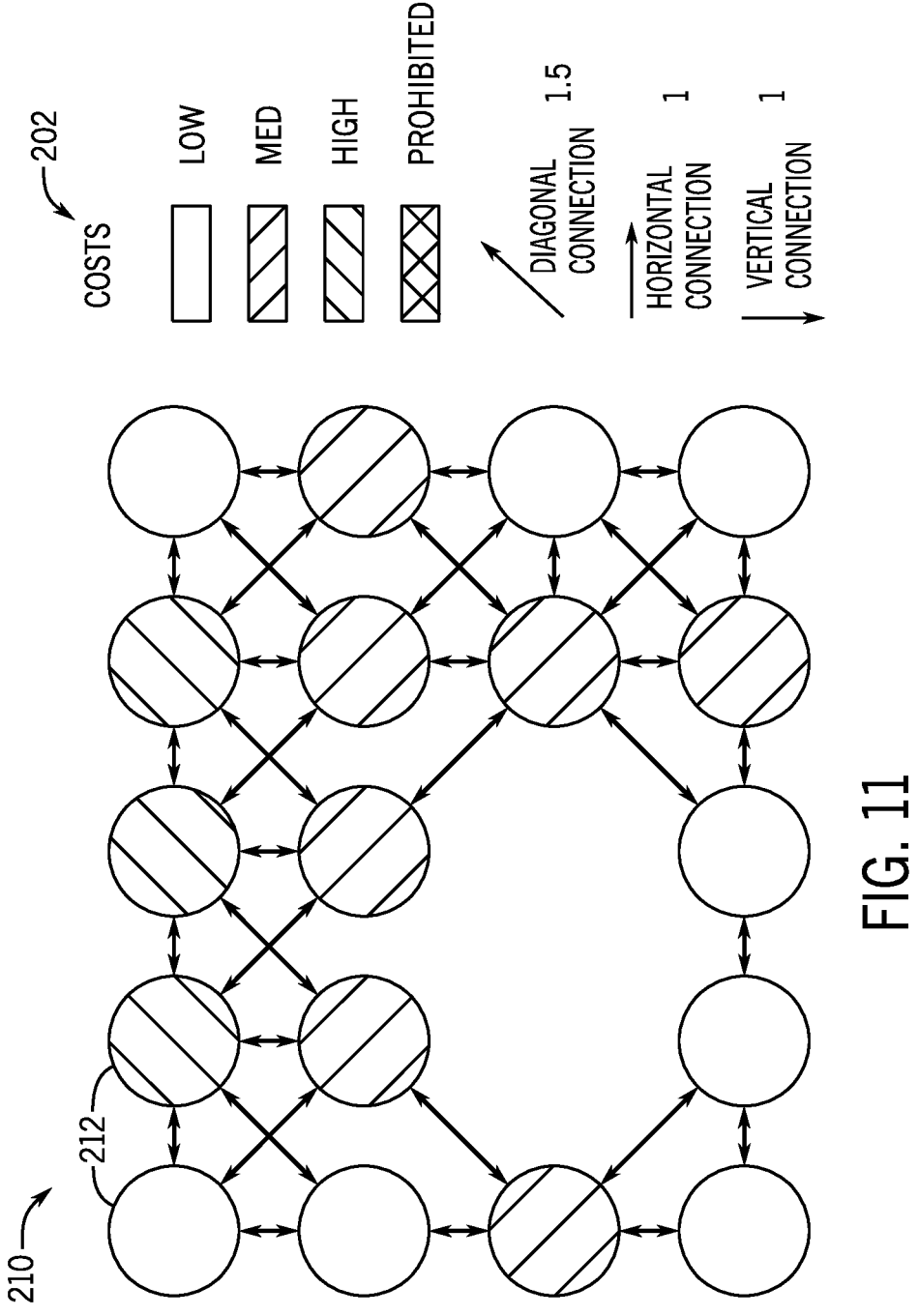
FIG. 11 is a cost graph accounting for topological complexities and direction of potential pipeline placement, according to one or more embodiments of this disclosure.

With regard to addressing topological complexity, the topology 180 may precisely characterize the placed facility optimal system. That is, referring back to block 164 of FIG. 8, the map 200 may be transformed to a cost graph 210, as shown in FIG. 11. The topological complexities (e.g., valleys, faults, hills) may be characterized in the map and precisely converted into the adequate cost graph 210. Likewise, prohibited areas 192 may be also characterized by merely eliminating these from the cost graph 210. These prohibited areas 192 may be, otherwise, penalized in a way to avoid them as much as possible to reduce the corresponding cost.

Referring to block 164 of the method 160 in FIG. 8, transforming the topology 180 (e.g., surface map) into a cost graph 210 may be performed using a static cost map transformation or a graph transformation. The static map transformation is performed on the topology map by applying, to each grid-cell, Equation (4):

$$Cost_{cell} = \frac{\sum_{i=0}^{m} cost\ (cell,\ adj_i)}{n} \tag{4}$$

Referring to Equation (4), cell is the grid cell for which the static cost is calculated; $adj_i$ is the set of grid cells that are adjacent to cell; n is the number of grid cells; and cost(x, y) is the estimate cost to build a pipeline segment between cells x and y. In some embodiments, the number of grid cells may be eight cells in the case of a quadrilateral mesh. Such a transformation converts the topology 180 into a cost graph 210 where the cost of building on each grid cell is estimated to be the average cost of building pipeline segments between this cell and all other adjacent cells. Each grid cell may be represented by its approximated cost 202 independently of the other cells on the cost graph 210 and the direction and position of the pipeline 28 being built on it.

On the other hand, a graph transformation may take into account the path and direction of a planned pipeline 28. In general, a graph may include a data structure that represents a list of interconnected nodes. Each connection (e.g., edge) may annotate the cost 202 of building the corresponding pipeline segment. To transform the topology 180 into a cost graph 210, we first create the graph where each vertex/node represents a grid cell on the map 200. Then, each node (e.g., Node$_1$) is connected to each of its adjacent nodes (e.g., Node$_2$) using a directional edge with weight equal to the estimated cost of building a pipeline from Node$_1$ to Node$_2$. The estimated cost of building a pipeline segment between two nodes is calculated using a cost function that can accommodate various factors when calculating the cost of pipelines (length, pressure drops, steepness/inclination, etc.). In some embodiments, the heuristic function may be estimated based on a reduced number of factors such as the length of the required pipeline 28 and the inclination of the built section to reduce computation complexity 104.

As shown in FIG. 11, each grid cell is translated into a graph node 212 (e.g., vertex) and is connected to each of its adjacent nodes through edges. Both the cost of acquiring the grid cell and the cost of building a connection are preserved. The developed A* algorithm may then traverse the developed cost graph 210 searching for the optimal path for each pipeline 28 given the pipeline's corresponding starting point 182 and target point 184.

Figure 12:
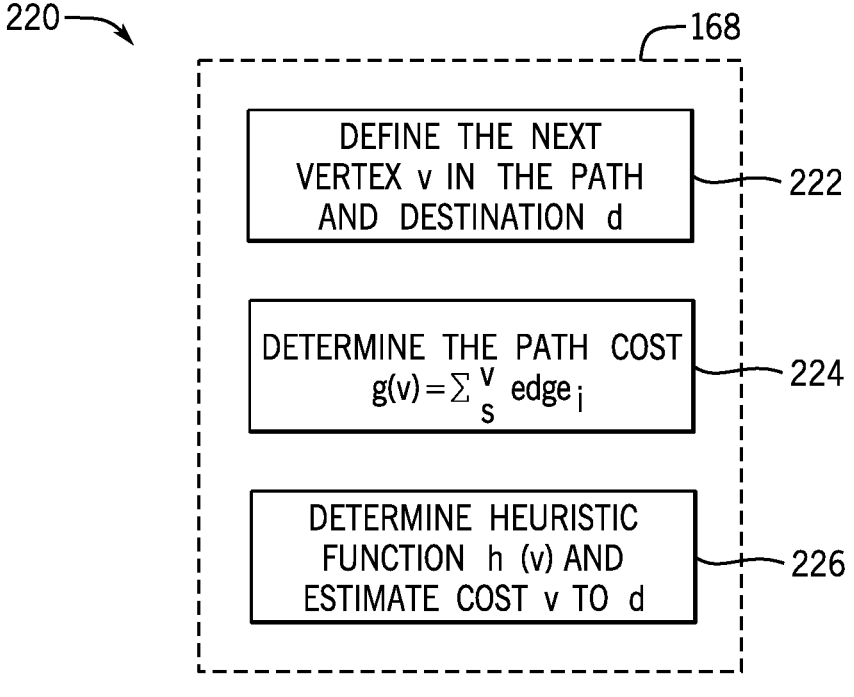
FIG. 12 is a flow diagram of an example process for finding the shortest path between two locations using an A* algorithm, according to one or more embodiments of this disclosure.

As discussed above, after generating the cost graph 210, the planning system 50 may utilize the A* algorithm as mentioned with respect to block 168. In general, the A* algorithm is a graph traversal algorithm used in various fields of computer science and artificial intelligence due to its completeness, optimality, and optimal efficiency. The A* algorithm uses a priority queue to assess potential paths when searching for the shortest path and will also stop when the first potential path reaches the destination. The A* algorithm uses a heuristic function that assess each node before adding it to the potential path and estimates the remaining cost of building a pipeline 28 from the next potential node to the destination. Method 220 of FIG. 12 is an example process for finding the shortest path using the A* algorithm. At block 222 vertexes C may be iteratively defined along with a destination d, and the path cost may be determined at block 224 by Equation (5):

$$g(v)=\Sigma_s{}^v edge_i \qquad (5)$$

Referring to Equation (5), s is the starting point 182 and $edge_i$ is an incremental connection between the starting point 182 and a vertex, v. By using the path costs for different vertexes, a heuristic function, h(v), may be determined to estimate the cost from the vertex to the destination, d, which may also be the target point 184. When implemented, the heuristic function may reduce the time and processing resources such as memory used in reaching the optimal solution while maintaining accuracy and precision. In some embodiments, the heuristic function may be modeled by a cost function that calculates the cost between two adjacent grid cells to estimate the cost of building a pipeline between any point along the path and the destination.

As discussed above, the benefits of implementing a map-based scheme for pipeline placement 96 and/or the facility placement optimization include addressing topological complexity, handling cost variations, providing extensible and flexible solutions, and the like. As should be appreciated, the planning system 50 may use the above methods in conjunction with one another or separately (e.g., independently). Furthermore, the above methods may be used simultaneous with each other to determine simultaneous analyses 102.

Returning to FIG. 4, as discussed above, the modular nature of the described methods allows for components of the hydrocarbon site 10 such as well placement 92, facility placement 94, pipeline placement 96, and/or well trajectory design 98 to be optimized simultaneously or independently or a combination thereof. As used herein, modular analysis techniques include performing various tasks during different time periods or separately from others. By way of example, as shown in FIG. 4, Scenario 1 includes determining well placement 92, facility placement 94, pipeline placement 96, and/or well trajectory design 98 in a sequential order according to a modular approach. In addition, Scenario 2 includes determining well placement 92 independently, facility placement 94 and pipeline placement 96 simultaneously, and well trajectory design 98 independently according to a modular approach.

Additionally, the algorithms implemented in the proposed framework of the planning system 50 break organizational silos between what have been traditionally separate domains, and provide multiple divisions of a hydrocarbon enterprise (e.g., reservoir specialists, drilling specialists, facility specialists, and economists) with a shared planning platform. For example, traditionally, different divisions or groups may govern respective aspects or components in the planning of a hydrocarbon site 10. However, in optimizing one aspect or component, other aspects may deviate from their own optimization and/or be rendered unviable. The planning system 50 may provide unified modular system for determining optimized hydrocarbon site layouts in an efficient manner.

Moreover, additional or fewer components may be integrated into the optimization framework depending on their applicability in different potential onshore and offshore oil and gas field development projects. The planning system 50 may be modular and flexible and allow for multiple layers of granularity and, hence, a spectrum of solutions with different trade-offs between accuracy of optimization of layout and computation efficiency, which may be specified by a user. In some embodiments, the planning system 50 may provide optimal well placement 94 (e.g., well count, location, etc.), optimal number of nodes at different facility layers (e.g., number of drill centers, gathering centers, etc.), optimal layout of pipelines 28, and optimal well trajectory 86, each honoring the system constraints. In some scenarios, for example depending on the size of the hydrocarbon site 10 and/or the number of wells 12, the computational complexity 104 may be reduced to reduce computation time and/or resources. As such, in some embodiments, the layout of part or all the building blocks (e.g., components) of the hydrocarbon site 10 are addressed sequentially rather than concurrently, and the level of granularity between a sequential solution, as in Scenario 1, and a fully integrated solution, as in Scenario 4, may be set by a user. As discussed above, although four scenarios are shown as example cases for the planning system 50, and suitable components or grouping of components may be optimized simultaneously or independently providing for new opportunities for cost reduction and driving value optimization.

Figure 13:
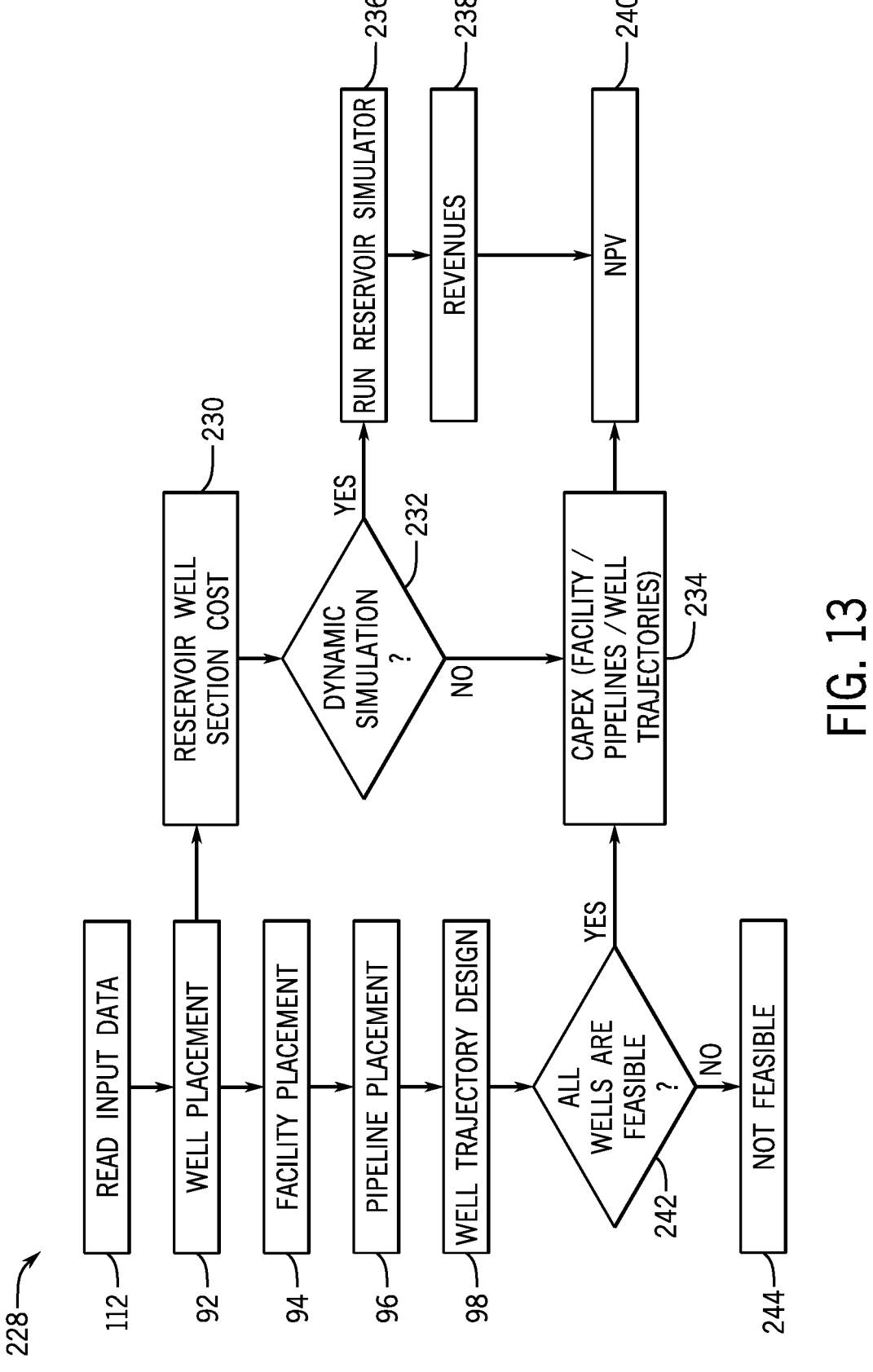
FIG. 13 is a flow diagram of an example method corresponding to the general workflow of Scenario 1 of FIG. 4, according to one or more embodiments of this disclosure.

Of the exampled scenarios 90, Scenario 1, having sequentially determined components, may have the lowest computational complexity 104 and, therefore, be the quickest to calculate. To help illustrate, FIG. 13 illustrates a flow chart of a method 228 corresponding to the general workflow of Scenario 1. As also shown in Scenario 1 of corresponding FIG. 4, the method 228 may include, independently and sequentially, reading and/or receiving input data 100 at block 112, determining well placement 92, determining facility placement 94, determining pipeline placement 96, and determining well trajectory design 98. As discussed above, independent analyses may use any suitable placement algorithm, which may include a PSO algorithm, the A* algorithm, or other optimization means.

Furthermore, in some embodiments, the method 228 may include determining the cost of the identified wells 12 (e.g., block 230) and determining whether to perform dynamic simulation of hydrocarbon production (e.g., block 232) and, hence, calculation of revenues. With dynamic simulation disabled, feasible well designs may lead to a calculation of expected hydrocarbon site expenditure such, as capital expenditure (CAPEX) (e.g., block 234). When dynamic simulation is enabled, a reservoir simulator may be executed by the planning system 50 (e.g., block 236) and the expected revenues from the reservoir may be calculated (e.g., block 238). In this way, the expected expenditure calculation may be combined with the expected revenues and well costs to calculate a net present value (NPV) or other economic driving value (e.g., block 240).

Furthermore, after determining the well trajectory design 98, the feasibility of the wells 12 may be determined at block 242. If the constraints of the planning system 50 (e.g., as input by a user and/or as dictated by the topology 180) do not yield feasible wells 12, the planning system 50 may proceed to block 244 and provide a notification that the input data does not yield a feasible design. In some embodiments, the planning system 50 may analyze the parameters and processes performed in determining the well placements 92, facility placements 94, pipeline placements 96, and well trajectory designs 98 to determine certain changes to the constraints that may allow for a feasible design to be generated.

As discussed above, the facility model may be represented by multiple layers, each containing multiple nodes (e.g. well entry points, drilling centers 76, gathering centers 80, and/or central processing facilities 84) such as in the PSO algorithm. As such, the PSO algorithm is an objective-function-agnostic optimizer that abstracts internal calculations and allows for easier integration with other algorithms and higher speed evaluations. Moreover, layers may represent sets of nodes of the same type, and a connection between layers may be a pipeline 28 or a well trajectory 86 (e.g., the trajectory from the drilling 76 center to the well's reservoir section entry point). In Scenario 1, while placing the facility nodes, pipelines 28 and well trajectories 86 may be simplified to Euclidean distances or may use the A* algorithm to account for topological complexities and associated constraints such as prohibited areas. Facility nodes may account for such complexities as part of the PSO algorithm.

Figure 14:
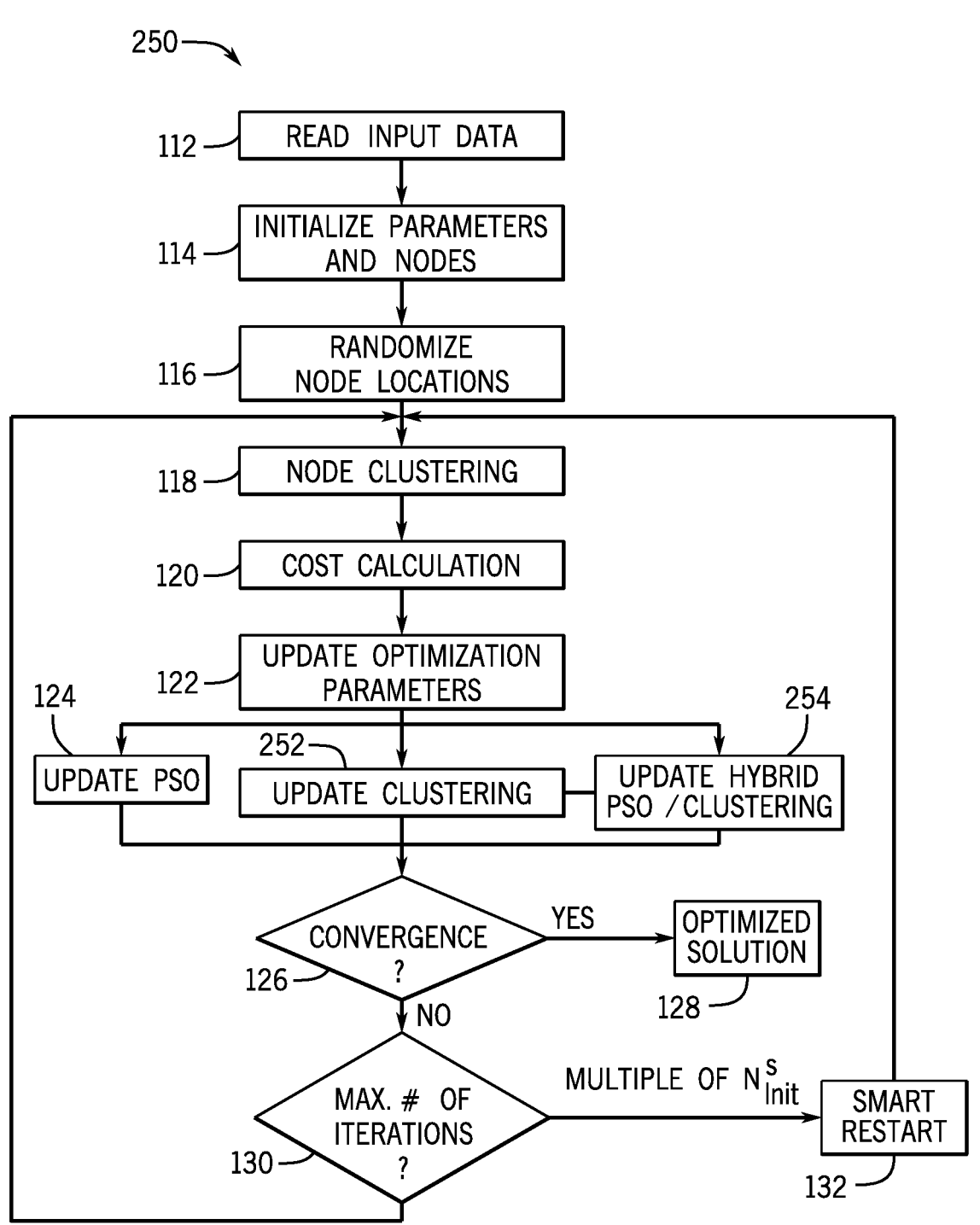
FIG. 14 is a flow diagram of an example method for using particle swarm optimization (PSO) operations to determine facility placements in accordance with Scenario 1, according to one or more embodiments of this disclosure.

To help further illustrate, FIG. 14 is a method 250 for performing PSO operations to determine facility placements 94 in accordance with Scenario 1. As should be appreciated, one or more of the blocks of FIGS. 14-19, and 21-23 may be similar to those of previously discussed methods or each other. For brevity, repeated blocks may not be discussed again. In addition, although the methods described in FIGS. 14-19 and 21-23 are described in a particular order and as performed by the planning system 50, it should be noted that the methods described below may be performed in any suitable order and by any suitable computing device.

Continuing with method 250 of FIG. 14, the planning system 50 may initialize by receiving input data 100 at block 112, initializing parameters and nodes at block 114 and randomizing node locations at block 116, as described above with respect to FIG. 5. The planning system 50 may also cluster nodes from lower layers by connecting them to nodes in upper layers at block 118, as described above with respect to FIG. 5. For example, wells 12 may be connected to drilling centers 76, and drilling centers 76 may be connected to gathering centers 80, etc. Following clustering, each particle evaluates the objective function based on the parameters provided by PSO during cost calculation at block 120, as described above with respect to FIG. 5. The evaluations returned from each particle may be compared amongst each other and with previous iterations. The local best solution (e.g., for each particle) and the global best solution are updated at block 122, as described above with respect to FIG. 5. Furthermore, the location of each particle in the PSO algorithm for the next iteration may be updated based on the variables at block 124, as described above with respect to FIG. 5.

Furthermore, although discussed herein as utilizing the PSO algorithm, other algorithms, such as clustering or a hybrid PSO/clustering algorithm, may be used. In this case, the planning system 50 may update the clustering and/or the hybrid PSO/clustering algorithm at blocks 252 and 254, respectively. A new set of node locations is thus obtained for each particle and ready for the next iteration in case convergence criteria are not met at block 126. If a maximum number of iterations is reached at block 130, the planning system 50 may implement a smart restart at block 132, as described above in FIG. 5.

Referring back to block 126, in some embodiments, the convergence criterion is based on the difference between the cost of the best-case particle (e.g., lowest cost) and that of the average case being within a prescribed tolerance. In any case, after the convergence criteria are met at block 126, the planning system 50 may proceed to block 128 and output the optimized solution for the facility nodes.

After facility nodes are placed, pipeline placement 96 and well trajectory design 98 may be determined. Pipeline layout optimization may use the A* algorithm, as described above. However, the pipeline layout optimization determined using the A* algorithm may not lead to an optimal solution that minimizes the total length as it is performed independently relative to the facility placement 94. At the end of the optimization, the planning system 50 may return the number of nodes in each layer, well trajectory designs 98, pipeline placements 96, and the total cost of the facility. In case a feasible facility cannot be generated from the given configuration, or a number of wells cannot be drilled within the specified constraints, an error message may be displayed with or without a remediation solution. Being the least complex of the scenarios 90, Scenario 1 may use relatively fewer computing and power resources as compared to other scenarios 90, but it may also lead to a sub-optimal solution as compared to the other scenarios 90.

Figure 15:
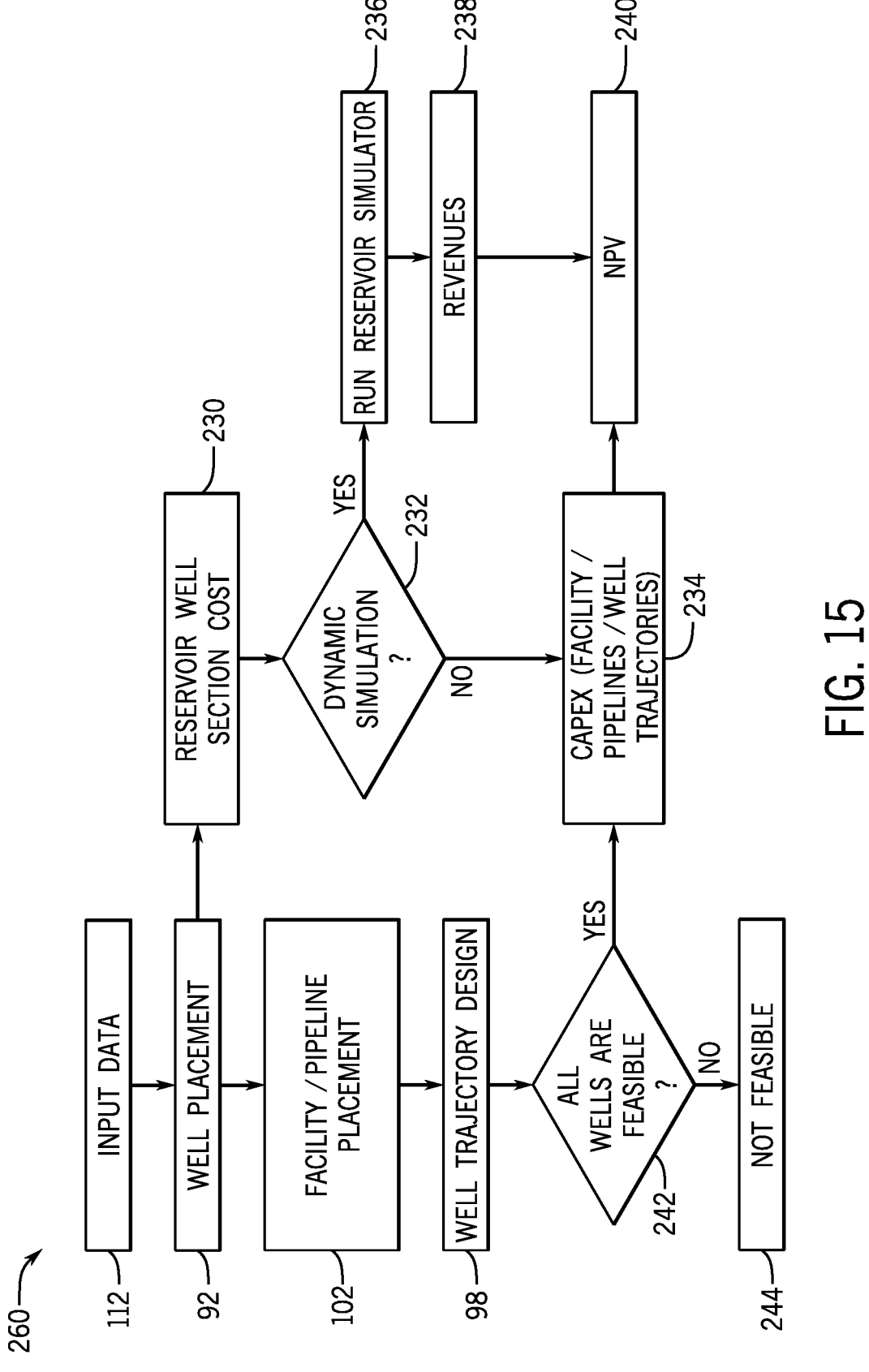
FIG. 15 is a flow diagram of an example method corresponding to the general workflow of Scenario 2 of FIG. 4, according to one or more embodiments of this disclosure.
Figure 16:
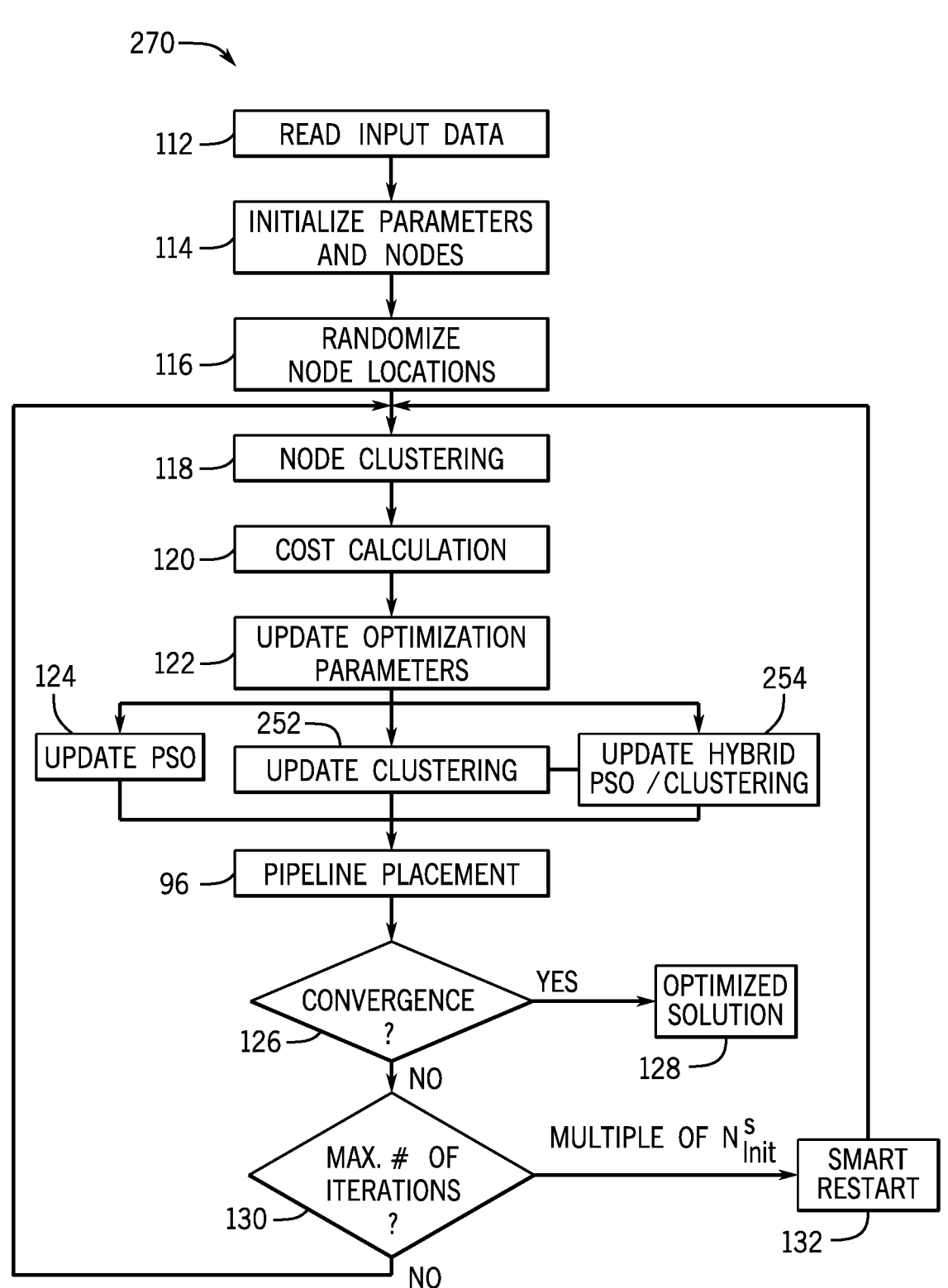
FIG. 16 is a flow diagram of an example method for using particle swarm optimization (PSO) operations to determine facility placements and pipeline placements in accordance with Scenario 2, according to one or more embodiments of this disclosure.

Scenario 2 incorporates a simultaneous analysis 102 of both facility placement 94 and pipeline placement 96, as shown in the method 260 of FIG. 15. In such a case, both facility nodes and pipelines 28 are simultaneously placed on one or more topological maps while accounting for potential prohibited and penalized areas. Furthermore, pipeline placement 96 may be incorporated into the iterative loop for the PSO algorithm, as described below in the method 270 of FIG. 16. In some embodiments, the pipeline placement 96 may utilize either Euclidean estimations of pipeline distances, the A* algorithm, or any other suitable algorithm within the PSO loop to simultaneously optimize the facility placement 94 with the pipeline placement 96.

Figure 17:
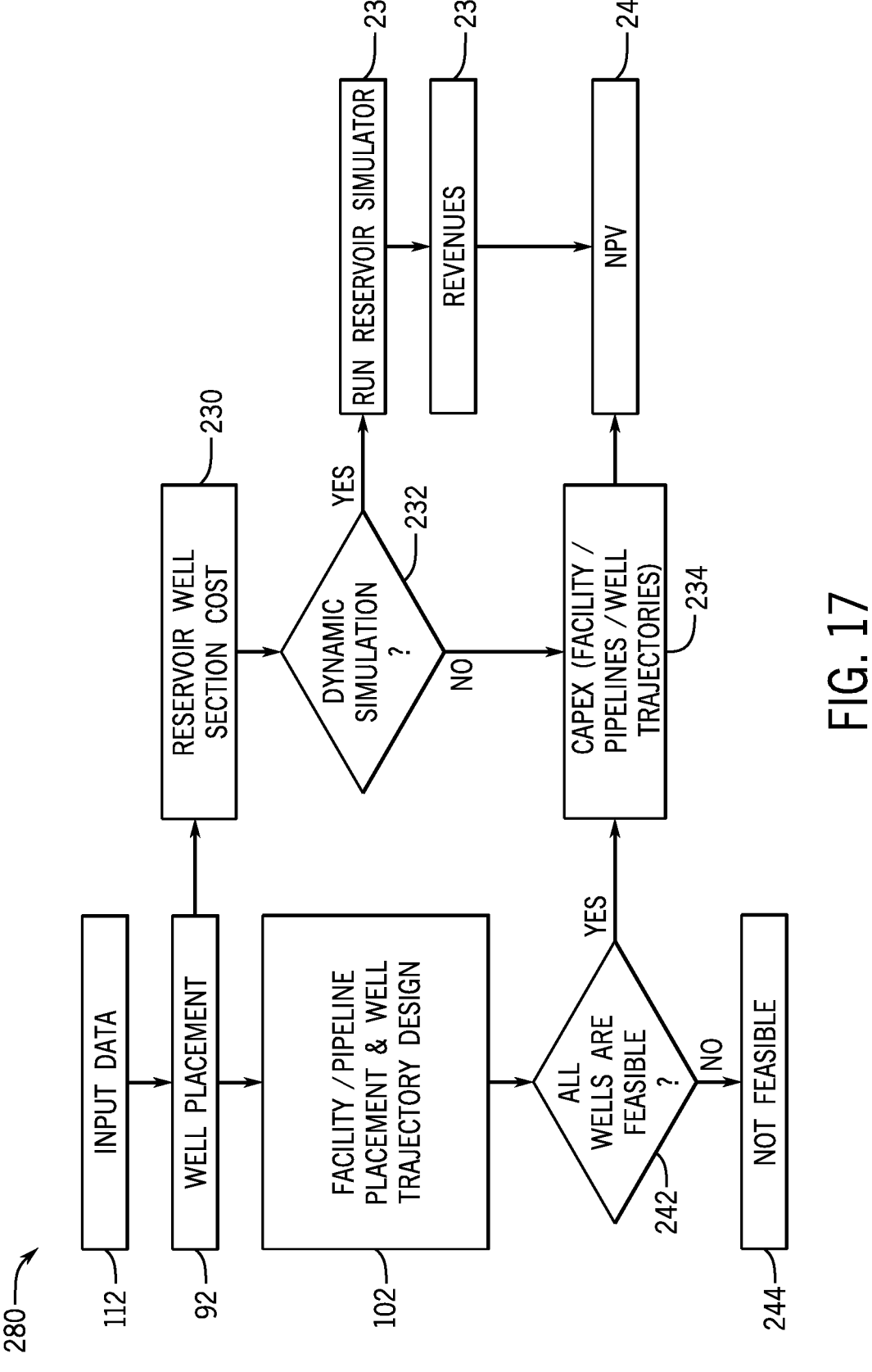
FIG. 17 is a flow diagram of an example method corresponding to the general workflow of Scenario 3 of FIG. 4, according to one or more embodiments of this disclosure.
Figure 18:
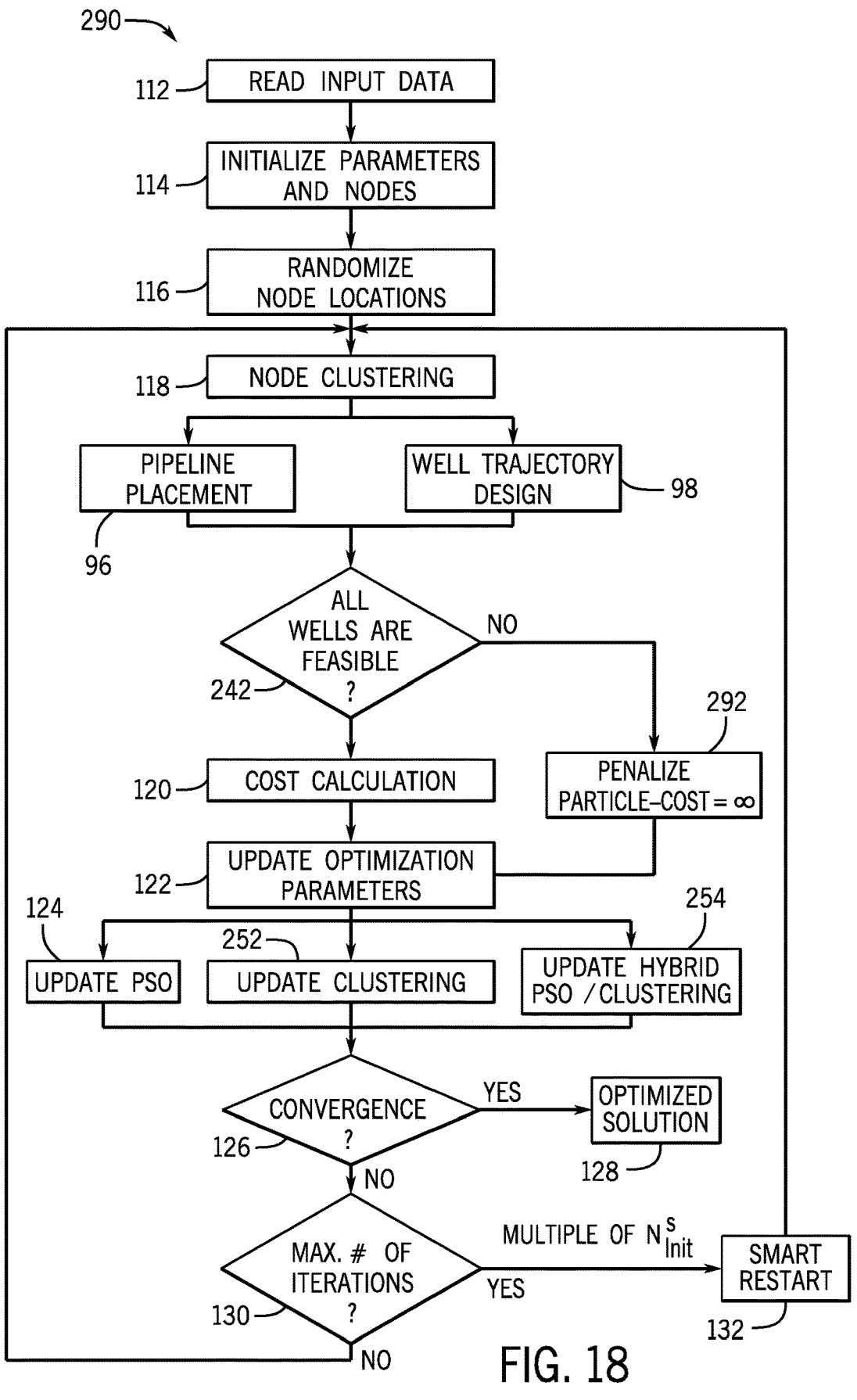
FIG. 18 is a flow diagram of an example method for using particle swarm optimization (PSO) operations to determine facility placements, pipeline placements, and well trajectory designs in accordance with Scenario 3, according to one or more embodiments of this disclosure.

Additionally, in Scenario 3, another degree of integration and, consequently, increased computational complexity 104 may be introduced, as compared to Scenarios 1 and 2, by adding well trajectory design 98 to the simultaneous analysis 102, as shown in the method 280 of FIG. 17. Furthermore, FIG. 18 illustrates a method 290 for the simultaneous analysis 102 of facility placement 94, pipeline placement, 96, and well trajectory design 98. Unlike Scenarios 1 and 2, where wells 12 are checked for their feasibility and well trajectory design 98 independently, in Scenario 3, the well trajectory design 98 is part of the PSO loop of the facility placement 94 and the pipeline placement 96. In some embodiments, when analyzing well trajectory design 98 as part of the PSO loop, the feasibility of the wells 12 may be checked at block 242, and thus may be part of the iterative loop. For example, in case one or more wells 12 are unfeasible, the objective function may be penalized at block 292, and the total cost of the hydrocarbon site 10 should increase to reflect its unfeasibility. Penalization may be used in non-gradient optimization algorithms, such as the PSO algorithm. For example, penalization may include modifying some variable to force the algorithm to diverge from an undesirable solution, while prevent the algorithm from converging to a final solution prematurely.

For example, in some embodiments the penalization may be a dynamic penalization that changes the penalty of unfeasible wells 12 based on the cost of other feasible wells 12 and the cost of drilling centers 76. In this technique, the penalty of an unfeasible well is calculated via Equation (6):

$$\text{Penalty}_{unfeasiblewell} = \max(2 \times \text{Cost}_{well}, 1.5 \times \text{Cost}_{drillingcenter}) \quad (6)$$

In practice, the penalty may provide a cost that is higher than the actual drilling of the well 12, if it was feasible, and higher than the cost for creating a drilling center 76 in case the well did not share a drilling center 76 with any other wells 12. Accordingly, unfeasible wells 12 may generally cost more than a feasible well 12 to reduce the likelihood of selecting an unfeasible well. In some embodiments, the penalty may be updated at each iteration at the start of employing the PSO algorithm and may eventually stabilize after costs are established.

The simultaneous analyses 102 of the facility placement 94, pipeline placement 96, and well trajectory design 98 may provide a high-accuracy model for the hydrocarbon site 10 as compared to the results of Scenarios 1 and 2, and may include solutions optimized to handle multiple different complexities. Furthermore, as with Scenarios 1 and 2, the pipeline placement 96 may be estimated by Euclidean distances (e.g., for faster runtime) or the A* algorithm for increased accuracy. Furthermore, in some embodiments, a smart selection algorithm may adjust the frequency of high-accuracy, more realistic modelling of connections such as the A* algorithm. In other words, the smart selection algorithm may delay the accurate modelling until the later stages of the optimization—when the final layout of the hydrocarbon site 10 is starting to form—and performs the modelling on a fraction of the particles. Both the frequency of the modelling and the threshold at which the modelling starts may be specified by the user. Such an approach may allow for granular accuracy and efficiency depending on available computational time and resources. For example, the final solution can generate models in seconds for quick prototyping, as compared to hours or day for building more accurate simulations.

Figure 19:
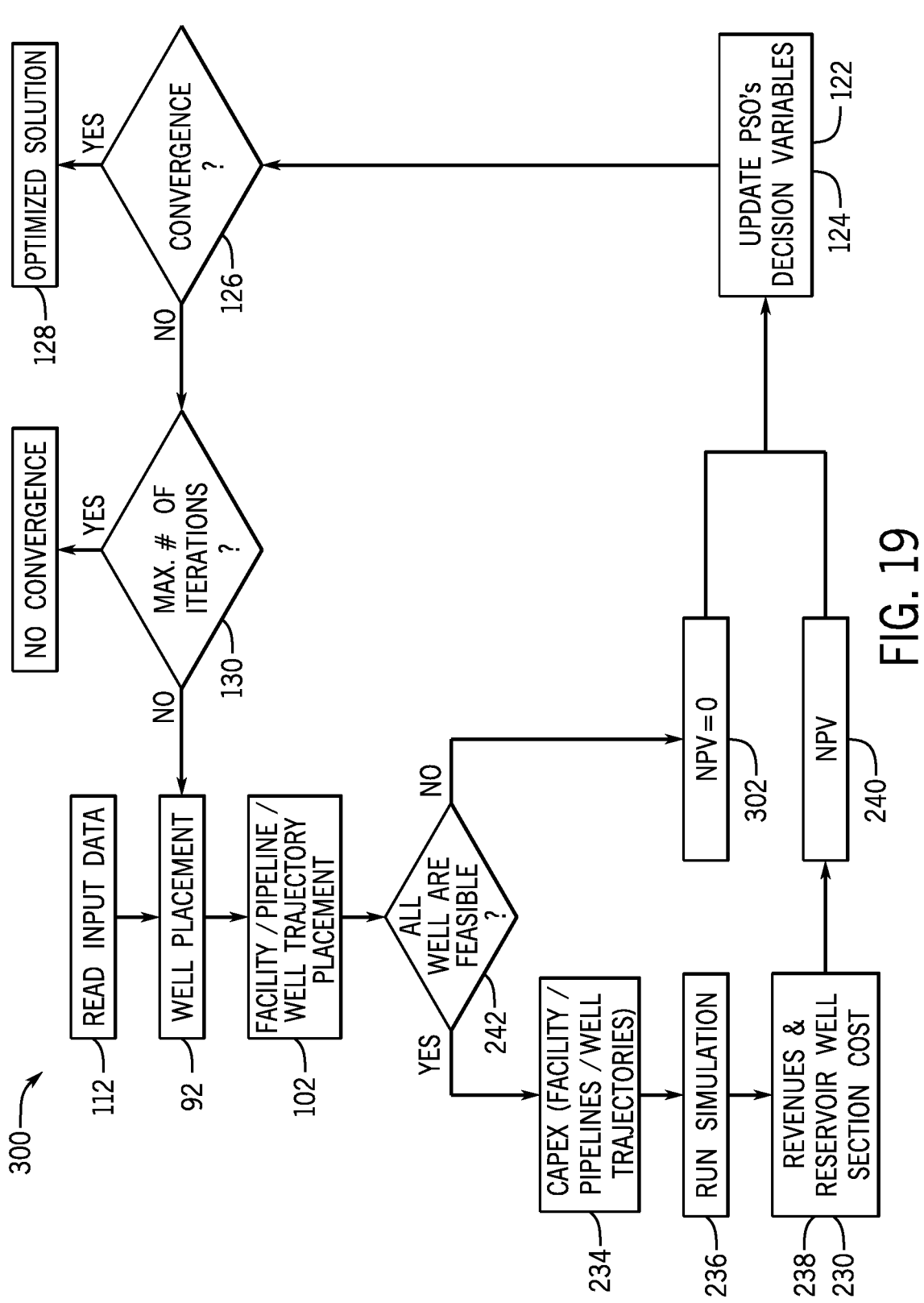
FIG. 19 is a flow diagram of an example method corresponding to the general workflow of Scenario 4 of FIG. 4, according to one or more embodiments of this disclosure.

Additionally or alternatively, in Scenario 4, well placement 92 may be integrated into the simultaneous analysis 102 of facility placement 94, pipeline placement 96, and well trajectory design 98 as provided in the method 300 of FIG. 19. Although additional components may be added to the simultaneous analysis 102, the integrated solution of Scenario 4 may provide the most comprehensive and/or the most optimal solution for the hydrocarbon site 10. Moreover, Scenario 4 may also be the most computationally demanding scenario 90. The integrated solution of the planning system 50 combines two-optimization processes characterized by two main iterative loops that work towards optimizing the NPV of the hydrocarbon site 10. The major loop (e.g., outer loop) of Scenario 4 may be governed by a black hole particle swarm optimization algorithm (BHPSO) that may be used to optimize well placement while the minor loop (e.g., inner loop) may be used to optimize the simultaneous analysis 102 of the well trajectory design 98, facility placement 94, and pipeline placement 96. In some embodiments, the minor loop may generally consist of the method 290 of FIG. 18.

Before proceeding, it should be noted that the following description of the method 300 for determining the integrated solution of Scenario 4, as depicted in FIG. 19, may be performed by the planning system 50 or any other suitable computing device. Referring now to FIG. 19, after reading the input data 100 at block 112, the method 300 may enter the major loop where, for each "particle," the BHPSO specifies the decision variables for well placement and, accordingly, places the wells 12 in the reservoir, which may include the "heel" and/or the "toe" of the wells 12 in case of horizontal wells as discussed further below. As a result, multiple reservoir simulation models may be generated corresponding to each PSO particle, such that each model may have a different set of wells. Then, every particle may enter the minor loop for simultaneously determining facility placement 94, pipeline placement 96, and well trajectory design 98. For example, the minor loop may generally perform the method 290 of FIG. 18 and output an optimized solution for the facility placement 94, pipeline placement 96 between the facility nodes, and the well trajectory design 98 from the well heel to the facility nodes (e.g., drilling center 76). Furthermore, the planning system 50 may run the minor loop for each of the well placement PSO particles in parallel to optimize run time. For example, multiprocessor computers may take further advantage of the parallel processing to reduce resource consumption and/or speed up computation time.

As with Scenario 3, if a well 12 is not feasible, the PSO algorithm may be penalized to avoid unfeasible solutions at block 302. For example, upon completion of the minor loop, a test may be performed to assess the well trajectory feasibility for each particle. In case there are any unfeasible wells 12 for a specific particle, the particle may be penalized by increasing the associated cost and/or allocating it a zero NPV to eliminate it from contributing to the next generation of particles. On the other hand, if all well trajectories 86 are feasible for the specific particle, the CAPEX for the facility placement 94, pipeline placement 96, and well trajectory design 98 may be calculated at block 234, and the associated development scenario may be simulated at block 236. Furthermore, the NPV may be computed at block 240 based on the generated CAPEX at block 234, the well costs at block 230, and the estimated revenues at block 238 from the simulation determined at block 236. Further, after the simulation runs of the BHPSO particles are completed (which in turn a parallel task), the BHPSO algorithm may update the optimization parameters at block 122 and update the decision variables at block 124 for the next iteration of the major loop.

Before moving to the next iteration of the major loop, the BHPSO algorithm may check for convergence by computing a difference between the average NPV and the maximum NPV of the particles at block 126, or check if the number of iterations has exceeded a predefined maximum at block 130. Convergence may imply that an optimal NPV has been identified with well trajectories 86 that are feasible. However, if no convergence is reached within the predefined maximum number of iterations, the major loop may terminate and output a non-convergence alert and/or the most recent (e.g., best-found) solution.

As should be appreciated, Scenario 4 may utilize Euclidean approximations for the pipeline placements 96 and/or well trajectory designs 98 or the A* algorithm for increased accuracy. Furthermore, in some embodiments, Scenario 4 may include the smart selection algorithm and adjust the frequency of high-accuracy modelling of connections such as the A* algorithm. Moreover, as discussed above, in some embodiments, different variants of the example scenarios 90 may be utilized (e.g., for tuning efficiency) including cases where well trajectory design 98 and/or pipeline placement 96 take place in individually (e.g., post processing), leading to hybrid scenarios between Scenario 3 and Scenario 4. Additionally or alternatively, variants of the scenarios 90 may optimize well trajectory 86 in its own minor loop (e.g., as a nested PSO algorithm within a major loop such as that of Scenario 4) or independently as its own PSO algorithm or other suitable algorithm.

Figure 20:
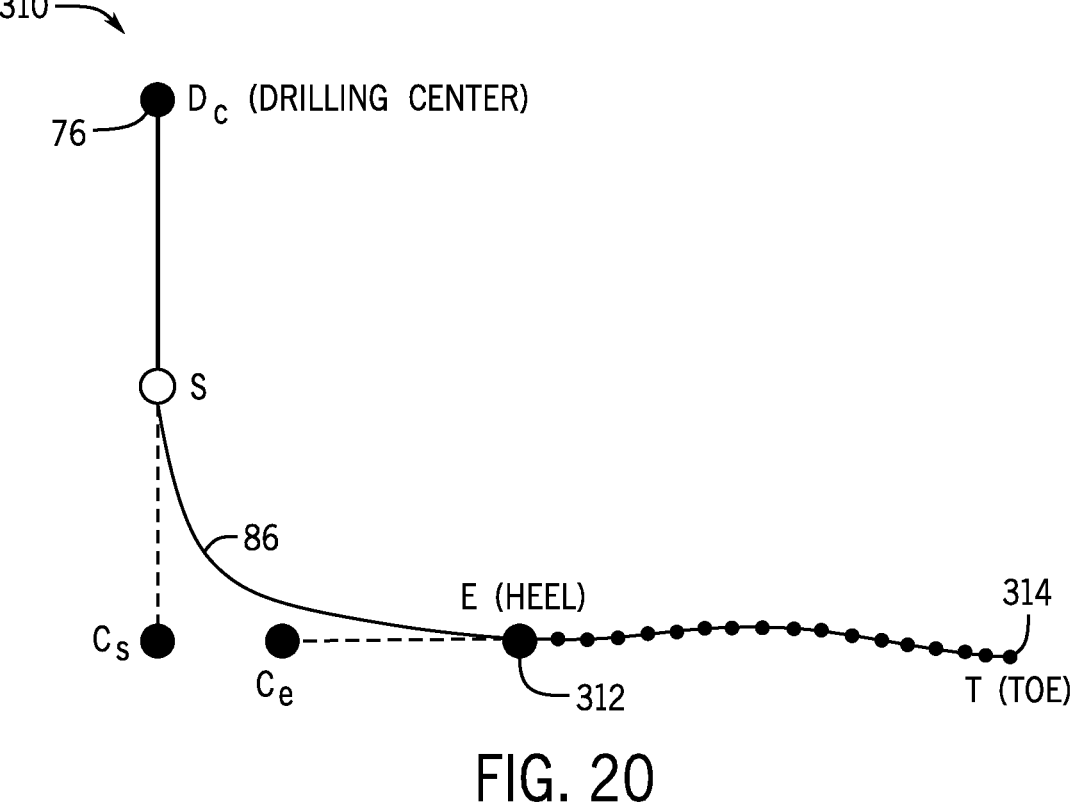
FIG. 20 is an example horizontal well having a heel, a toe, and a well trajectory between a drilling center and the heel, according to one or more embodiments of this disclosure.
Figure 21:
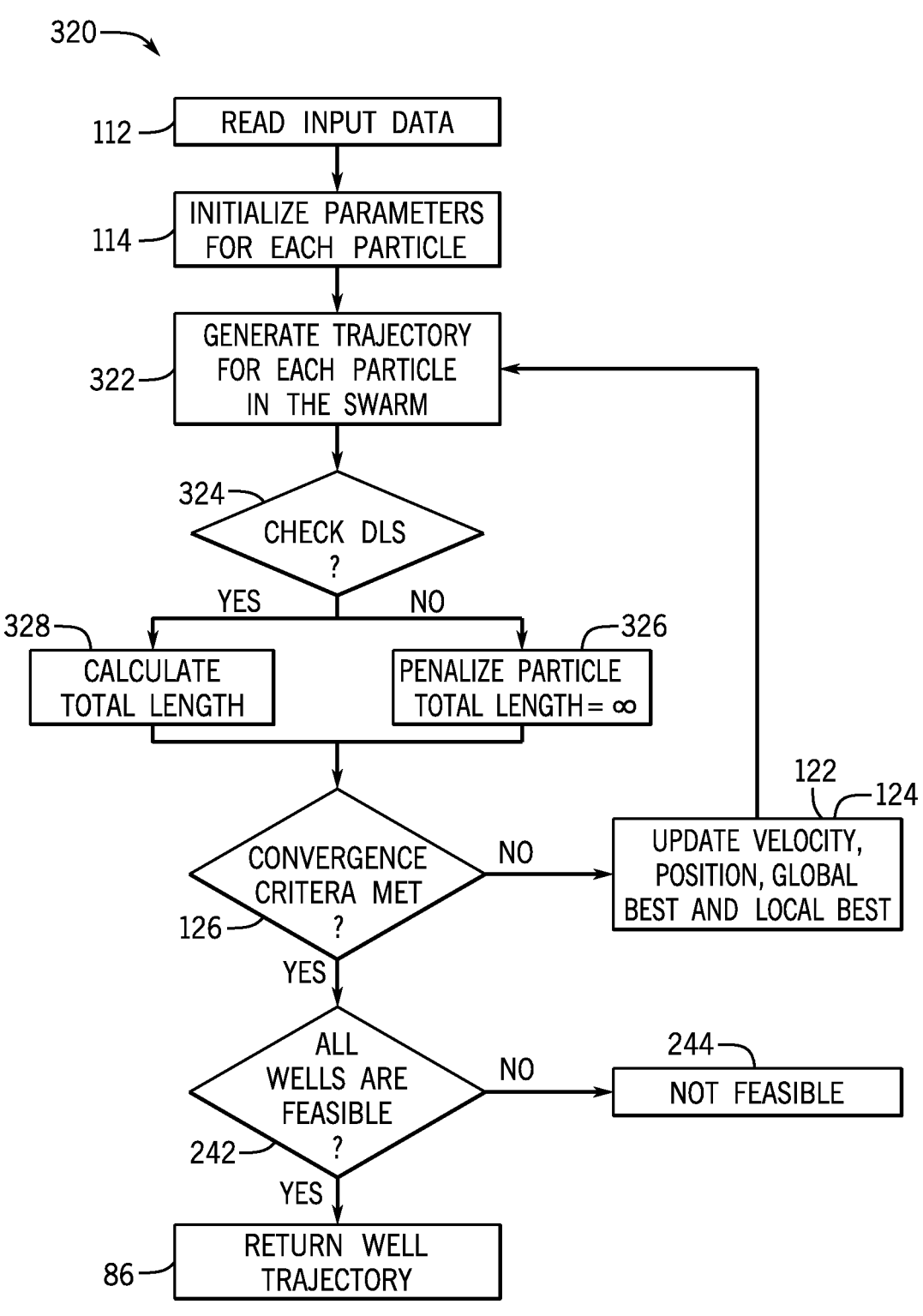
FIG. 21 is a flow diagram of an example method for determining well trajectory design using a PSO algorithm, according to one or more embodiments of this disclosure.

For example, FIG. 20 illustrates an example horizontal well 310 having a heel 312, E, a toe 314, T, and a well trajectory 86 between a drilling center 76 and the heel 312. In some embodiments, the well trajectory design 98 may be analyzed using a Bézier curve based method. For example, the well trajectory design 98 may be given by the expression $B(B_x, B_y, B_y)$, $U \in [0,1]$ by solving for Equation (7):

$$B(U) = S(1-U)^3 + 3(1-U)^2 UCs + 3(1-U)U^2 Ce + U^3 E \qquad (7)$$

Referring to Equation (7), the interval [0,1] corresponds to points [S, E] in the three dimensional space of the horizontal well 310. Additionally, $S(D_{C_x}, D_{C_y}, S_z)$ and $E(E_x, E_y, E_z)$ depict the kick-off/source point and the target/end point, respectively. The total length of the well trajectory from $D_C$ to E may be minimized while honoring the constraints of:

B is tangent to $\overrightarrow{SC_s}$ at S and to $\overrightarrow{EC_e}$ at E;

Both curve and its derivatives are continuous at S and E; and

Dog-leg severity (DLS).

Furthermore, optimization of the well trajectory 86 while honoring the above constraints takes place by changing the location of $C_s$ ($C_{s_x}, C_{s_y}, C_{s_z}$) and $C_e$ ($C_{e_x}, C_{e_y}, C_{e_z}$) to satisfy Equation (8) and Equation (9):

$$C_s = ds \cdot \overrightarrow{t_s} + S \qquad (8)$$

$$C_e = de \cdot \overrightarrow{t_e} + E \qquad (9)$$

Referring to Equation (8) and Equation (9), $\overrightarrow{t_s}$ is the unit tangent vector at S ($\overrightarrow{SC_s}$); $\overrightarrow{t_e}$ is the unit tangent vector at E ($\overrightarrow{EC_e}$); ds is an arbitrary scalar parameter to determine the position of the attractor point $C_s$; de is an arbitrary scalar parameter to determine the position of the attractor point $C_e$; and $S_z$ is the z component of S within a prescribed range $[S_{z_1}, S_{z_2}]$. Additionally, the well trajectory length may be minimized by changing the location of $S_z$, $C_s$, and $C_e$ while honoring the above-mentioned constraints. This can take place iteratively or, more efficiently, using an optimizer with a minimum well trajectory length as objective function. To help illustrate, FIG. 21 includes a flowchart of a method 320 summarizing the optimization of well trajectory design 98 using another PSO algorithm.

In some embodiments, the well trajectory design 98 takes place iteratively, such as in the integrated solutions of Scenarios 3 and 4. As such, the planning system 50 may optimize well trajectory design 98 independently or as part of a simultaneous analysis 102. For example, in some embodiments, the method 320 may include receiving or reading input data 100 at block 112 and initializing parameters for each particle of the PSO at block 114. Additionally, the trajectory for each particle of the PSO may be generated at block 322, and the dog-leg severity (DLS) may be checked relative to a threshold value (e.g., a preprogrammed or user set threshold value) at block 324. If the DLS is greater than some threshold for a particular particle, the total length associated with the candidate well trajectory 86 may be set to infinity or some suitable high value to penalize the candidate well trajectory 86 at block 326. On the other hand, if the DLS is within an acceptable range (e.g., less than threshold), the total length of the candidate well trajectory 86 may be calculated at block 328. Further, if convergence criteria are not met, the PSO may be updated and new candidate well trajectories 86 may be generated. However, if convergence criteria are met, the well(s) with their associated well trajectories 86 may be checked for feasibility at block 242. The well(s) 12 may return as not feasible or, if they are feasible, the optimal well trajectory 86 may be output.

In general, the planning system 50 may result in a set of feasible wells 12 at some computational cost. However, in some instances, unfeasible well trajectories 86 may emerge, for example due to a breach in a dog leg severity constraint, a total depth constraint, or both. In such a case, an automated heuristic workflow such as in the methods 330 and 334 of FIGS. 22 and 23 may be applied to address well unfeasibility.

Figure 22:
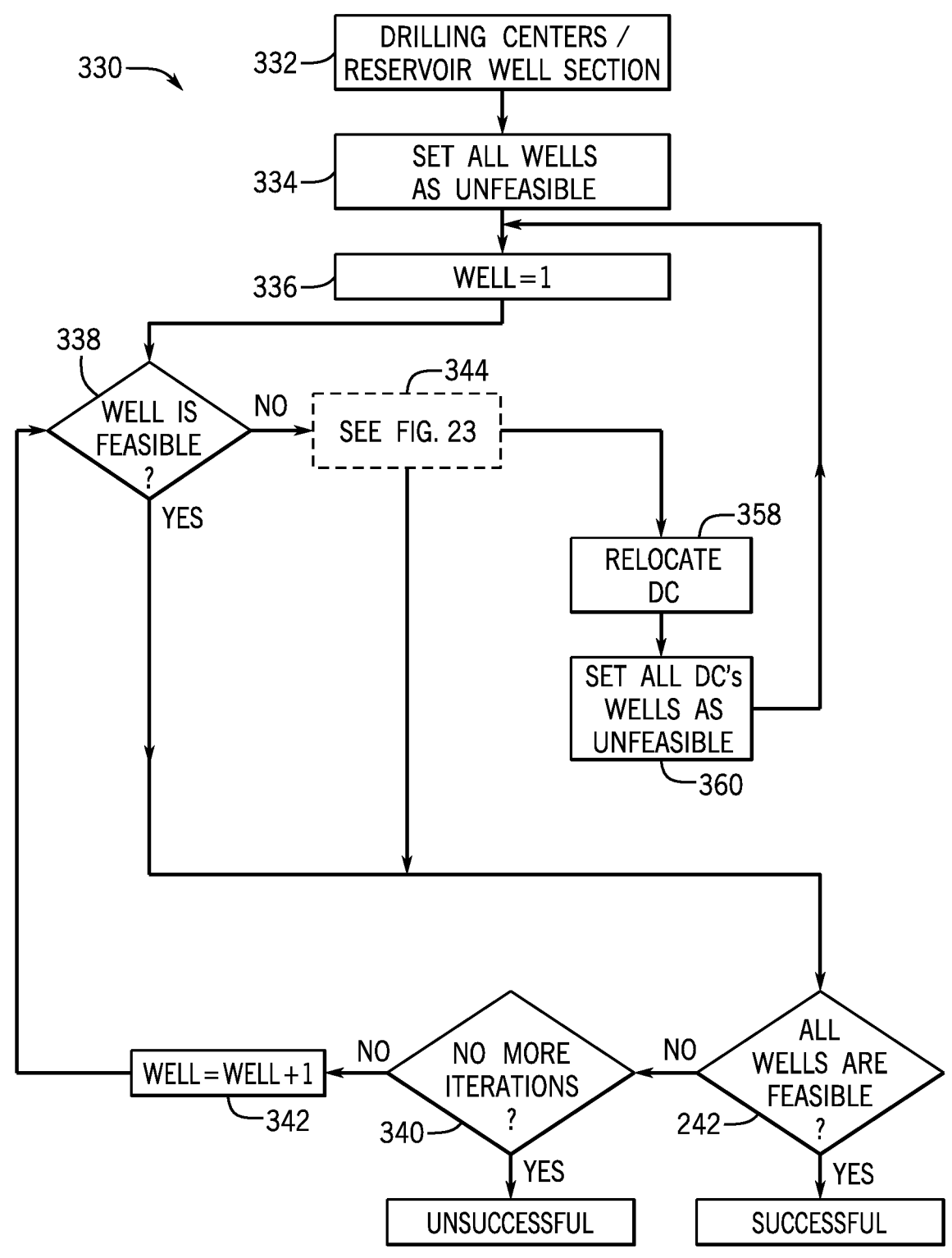
FIG. 22 is a flow diagram of an example method of an automated heuristic workflow to address well feasibility, according to one or more embodiments of this disclosure.

Referring now to FIG. 22, the planning system 50 may receive prescribed drilling centers 76 and well placements 94 at block 332. As such, the planning system 50 may iterate a loop that goes through each well 12 to "fix" the unfeasible ones. For example, prior to entering the loop, each well 12 may be set to unfeasible at block 334. The loop may begin at a first well 12 (e.g., block 336) and check its feasibility at block 338. If a well 12 is found feasible, the planning system 50 may check if each received well 12 are determined to be feasible at block 242. If not, the number of iterations may be checked (e.g., against a threshold level of iterations) at block 340. If a maximum threshold of iterations has been reached, the "fix" of unfeasible well trajectories 86 may be determined as unsuccessful, which may be accompanied by an error message and/or a recommendation. If the maximum threshold of iterations has not been reached, another well 12 of the received wells may be selected (e.g., via block 342) and tested for feasibility.

Figure 23:
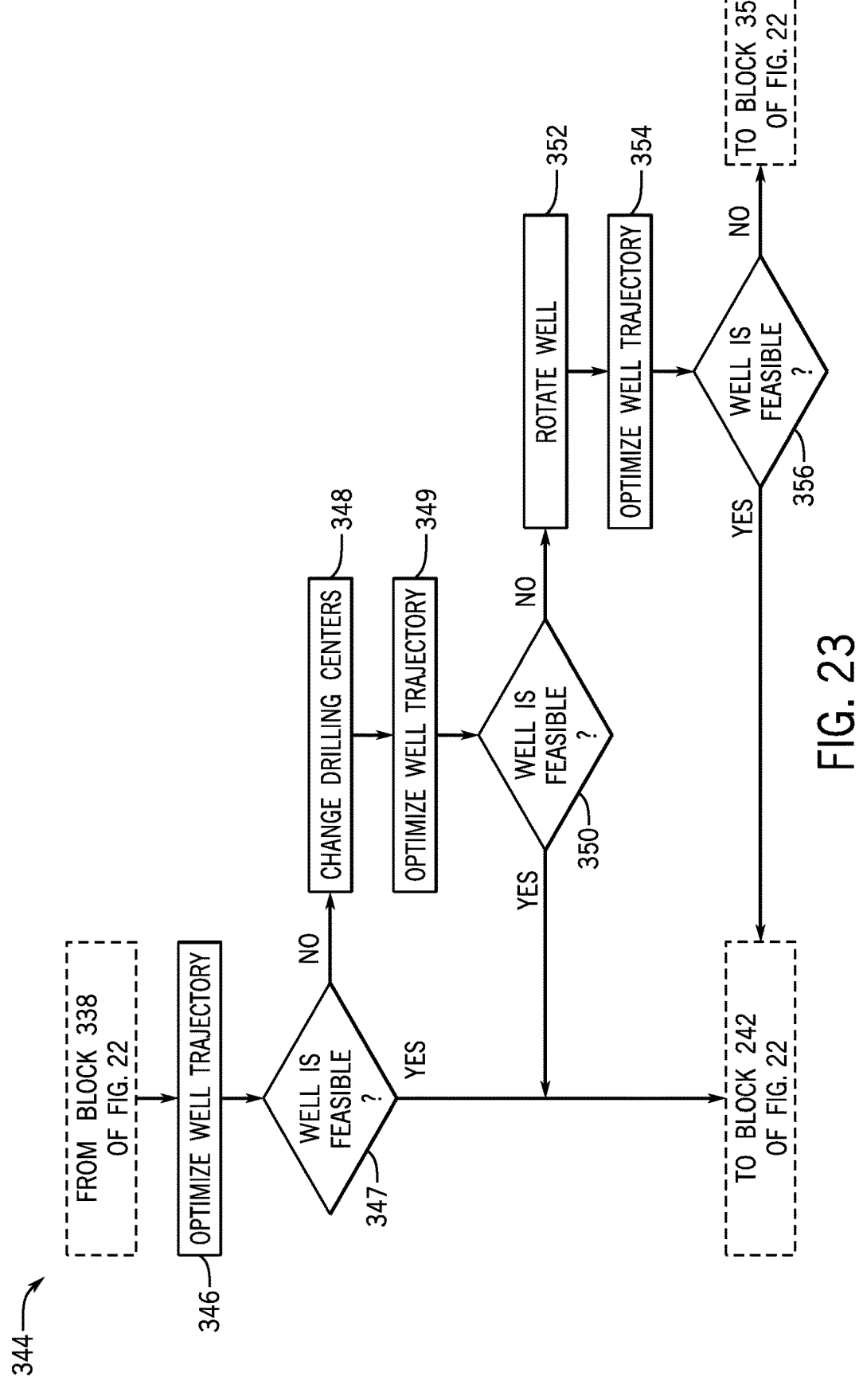
FIG. 23 is a flow diagram of a portion of the method of FIG. 22, according to one or more embodiments of this disclosure.

Referring back to block 338, if a well 12 is found to not be feasible, the planning system 50 may attempt to rectify it by proceeding to block 344, which is expanded upon in FIG. 23. Referring to FIG. 23, the planning system 50 may attempt to optimize the well trajectory 86 at block 346. After optimizing the well trajectory 86, the well 12 may be evaluated again for feasibility at block 347. If the well 12 is determined to be unfeasible at block 347, the planning system 50 may check whether another drilling center 76 has available capacity and switch to the other drilling center at block 348. The well trajectory may be optimized again at block 349, and the well trajectory, utilizing the new drilling center 76, may be checked for feasibility at block 350. If the well 12 is not feasible, the planning system 50 may rotate a well 12 (e.g., in the case of a horizontal well) at prescribed incremental angles (e.g. 5, 10, 15, 45, 90 degrees) at block 352. Moreover, the rotated well 12 may be located, for instance, on a relatively high cumulative net hydrocarbon thickness on a net hydrocarbon thickness map. After each increment, the well trajectory may be optimized at block 354.

After optimizing the well trajectory at block 354, the planning system 50 may proceed to block 356 to again check well feasibility. If the well 12 is feasible, the planning system 50 may proceed to block 242 of FIG. 22. However, if the well 12 is not feasible, the planning system 50 may proceed to block 358 of FIG. 22 and relocate one or more drilling centers 76 within a threshold area. In this case, the wells 12 associated with the relocated drilling center(s) 76 may be set as unfeasible at block 360. As a result, the planning system 50 may return back to block 336 to recheck the wells 12 at the relocated drilling center(s) 76 for feasibility. The planning system 50 may keep running/attempting to fix wells 12 until all well trajectories 86 are feasible or a maximum number of attempts is reached.

Referring back to blocks 347, 350, and 356 of FIG. 23, if the planning system 50 determines that the well is feasible at either of these blocks, the planning system 50 may proceed to block 242 of FIG. 22 to determine whether each of the provided wells 12 has been determined to be feasible. As mentioned above, if the total number of wells are not determined to be feasible, the number of iterations may be checked (e.g., against a threshold level of iterations) at block 340. If a maximum threshold of iterations has been reached, the "fix" of unfeasible well trajectories 86 may be determined as unsuccessful, which may be accompanied by an error message and/or a recommendation. If the maximum threshold of iterations has not been reached, another well 12 of the received wells may be selected (e.g., via block 342) and tested for feasibility.

With regard to providing improved extensibility and flexibility, the presently disclosed techniques provide a capability to augment various maps to ease the demonstration of several aspects and provide different realistic circumstances for diverse real-life oil and gas fields' facility placement requirements. As such, the user may modify or edit the map data described above to reflect current conditions. That is, the planning system 50 may enable a user to edit map data to include placing facility planning nodes of different logical layers on different physical layers/horizons. Several horizons may be used by the developed algorithm and demonstrated into the same graph. As a result, the planning system 50 enables modular and flexible addition of different facility optimization layers without adding simulations or computations to handle realistic facility placement scenarios. In addition, the planning system 50 may allow for the integration of different cost factors into the cost function. In addition to the topology map, the planning system 50 may receive land cost map to approximate the land acquisition cost once placing a facility system. As such, the planning system 50 described above provides the capability to straightforwardly consider various cost factors permits to generate and test using diverse scenarios without having to change the procedure described above and without effecting the memory and computational complexity of the developed algorithm. Moreover, the planning system 50 may dynamically integrate more cost factors by receiving additional cost map that symbolizes the corresponding cost factor. This flexibility offers the capability to test diverse complexity levels without additional setup and to examine adding numerous cost factors sensitivity with no need to express a cost model to each case.

Reference throughout this specification to "one embodiment," "an embodiment," "embodiments," "some embodiments," "certain embodiments," or similar language means that a particular feature, structure, or characteristic described in connection with the embodiment may be included in at least one embodiment of this disclosure. Thus, these phrases or similar language throughout this specification may, but do not necessarily, all refer to the same embodiment. Although this disclosure has been described with respect to specific details, it is not intended that such details should be regarded as limitations on the scope of this disclosure, except to the extent that they are included in the accompanying claims.

Additionally, the methods and processes described above may be performed by a processor. Moreover, the term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the embodiments set forth in this disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for identifying a plurality of locations for a plurality of components and arranging the plurality of components of a hydrocarbon production site, the method comprising:

receiving, via a processor, input data comprising one or more gridded maps comprising areas, a plurality of sets of coordinates for a plurality of wells, and cost data associated with at least one of the plurality of components, the cost data comprising a sub-cost of installing a portion of the hydrocarbon production site at each corresponding area of the one or more gridded maps;

building, via an iterative convergence algorithm executed by the processor, a model representing an optimized cost solution, wherein building the model comprises:

transforming the areas of the one or more gridded maps into a set of nodes, each node of the set of nodes being connected to an adjacent node of the set of nodes via a connection edge annotating the sub-cost associated with the corresponding area;

determining, via the processor, a set of candidate components that corresponds to the plurality of locations based on the input data and a first algorithm;

determining, via the processor, one or more additional sets of candidate components that correspond to the plurality of locations based on the input data, the set of candidate components, and the first algorithm; and iteratively generating, via the processor, one or more additional maps indicative of the plurality of locations for the plurality of components until the iterative convergence algorithm converges onto the optimized cost solution, wherein iteratively generating the one or more additional maps is based on;

at least one of the one or more additional sets of candidate components; and the connection edge; and arranging the plurality of components at the hydrocarbon production site based on the optimized cost solution.

2. The method of claim 1, wherein the input data comprises:

a plurality of physical layers associated with the areas;

logical layer data representative of a plurality of logical layers associated with different operations performed by the hydrocarbon production site;

one or more prohibited areas of the areas; or any combination thereof.

3. The method of claim 2, wherein determining the set of candidate components comprises:

identifying a first set of locations for a first set of candidate components associated with the plurality of locations within at least two portions of the plurality of logical layers based on the first algorithm comprising a particle swarm optimization algorithm;

grouping a first portion of the first set of candidate components based on one or more distances between two or more candidate components of the first portion of the first set of candidate components;

determining an updated first set of locations based on the first portion of the first set of candidate components and capacity data associated with the first set of candidate components; and determining a first total cost for building the hydrocarbon production site based on the updated first set of locations, connection cost data associated with providing fluid connections between at least some components of the first portion of the first set of candidate components.

4. The method of claim 3, wherein determining the one or more additional sets of candidate components comprises:

identifying a second set of locations for a second set of candidate components associated with the plurality of locations based on the input data, the particle swarm optimization algorithm, and the updated first set of locations;

grouping a second portion of the second set of candidate components based on one or more additional distances between two or more additional candidate components of the second portion of the second set of candidate components;

determining an updated second set of locations based on the second portion of the second set of candidate components and additional capacity data associated with the second set of candidate components; and determining a second total cost for building the hydrocarbon production site based on the updated second set of locations, additional connection cost data associated with providing additional fluid connections between at least some components of the second portion of the second set of candidate components.

5. The method of claim 1, comprising:

determining, via the processor, a set of candidate well placements based on the input data and a second algorithm;

determining, via the processor, one or more additional sets of candidate well placements based on the input data, the set of candidate well placements, and the second algorithm; and generating via the processor, the plurality of sets of coordinates based on the one or more additional sets of candidate well placements.

6. The method of claim 1, comprising:

determining, via the processor, a second set of candidate components that corresponds to a plurality of well trajectories based on the input data and a second algorithm;

determining, via the processor, one or more second additional sets of candidate components that correspond to the plurality of well trajectories based on the input data, the second set of candidate components, and the second algorithm; and generating, via the processor, the plurality of well trajectories based on the one or more second additional sets of candidate components.

7. The method of claim 1, wherein determining the set of candidate components comprises simultaneously determining:

a set of candidate facility placements; and a set of candidate pipeline routes between at least two of the set of candidate facility placements.

8. The method of claim 1, wherein determining the set of candidate components comprises simultaneously determining:

a set of candidate facility placements;

a set of candidate pipeline routes between at least two of the set of candidate facility placements; and a set of well trajectories between the plurality of sets of coordinates for the plurality of wells and the set of candidate facility placements.

9. The method of claim 1, wherein determining the set of candidate components comprises simultaneously determining:

a set of candidate well placements;

a set of candidate facility placements;

a set of candidate pipeline routes between at least two of the set of candidate facility placements; and a set of well trajectories between the set of candidate well placements and the set of candidate facility placements.

10. The method of claim 1, wherein determining the set of candidate components comprises simultaneously determining a plurality of different types of candidate components.

11. The method of claim 1, wherein identifying the plurality of locations for the plurality of components comprises:

determining a set of pipeline placements between a set of facility locations for the hydrocarbon production site based on an A* algorithm.

12. The method of claim 11, wherein the set of pipeline placements comprise one or more optimal routes between the set of facility locations.

13. The method of claim 12, wherein the one or more optimal routes account for topological complexities comprising mountains, valleys, faults, or any combination thereof.

14. The method of claim 11, wherein the set of pipeline placements avoids one or more prohibited areas of the areas.

15. The method of claim 1, wherein each area of the areas defines a quadrilateral grid block.

16. The method of claim 1, wherein the first algorithm comprises a particle swarm optimization algorithm.

17. A hydrocarbon production site planning system comprising:

a display;

one or more processors in communication with the display; and one or more memories comprising instructions that, when executed by the one or more processors, cause the one or more processors to identify a plurality of locations for a plurality of components of the hydrocarbon production site by executing an iterative convergence algorithm for building a model representing an optimized cost solution, wherein building the model comprises:

receiving, via the one or more processors, input data comprising a map representative of an area comprising gridded areas, a plurality of sets of coordinates for a plurality of wells, and cost data associated with at least one of the plurality of components;

transforming, via the one or more processors, the gridded areas into a set of nodes, each node of the set of nodes being connected to an adjacent node of the set of nodes via a connection edge annotating environmental features associated with a corresponding gridded area of the gridded areas;

determining, via the one or more processors, a set of candidate components that corresponds to the plurality of locations based on the input data and a sub-algorithm;

determining, via the one or more processors, one or more additional sets of candidate components that correspond to the plurality of locations based on the input data, the set of candidate components, and the sub-algorithm; and iteratively generating, via the one or more processors, one or more additional maps indicative of the plurality of locations for the plurality of components until the iterative convergence algorithm converges onto the optimized cost solution, wherein iteratively generating the one or more additional maps is based on:

at least one of the one or more additional sets of candidate components; and the connection edge; and visually simulating, via the display, the plurality of locations for the plurality of components of the hydrocarbon production site based on the optimized cost solution.

18. The system of claim 17, wherein the sub-algorithm comprises a particle swarm optimization algorithm.

19. A computer program comprising instructions, that when executed by a computer processor of a computing device, causes the computing device to:

build, via an iterative convergence algorithm executed by the computer processor, a model representing an optimized cost solution, wherein building the model comprises:

receive, via the computer processor, input data comprising a map representative of an area, a plurality of sets of coordinates for a plurality of wells, and cost data associated with at least one of a plurality of components;

transforming a set of areas of the represented area into a set of nodes, each node of the set of nodes being connected to an adjacent node of the set of nodes via a connection edge annotating a sub-cost associated with a corresponding area of the set of areas;

determine, via the computer processor, a set of candidate components that corresponds to a plurality of locations based on the input data and an algorithm;

determine, via the computer processor, one or more additional sets of candidate components that correspond to the plurality of locations based on the input data, the set of candidate components, and the algorithm; and iteratively generate, via the computer processor, one or more additional maps indicative of the plurality of locations for the plurality of components until the iterative convergence algorithm converges onto the optimized cost solution based on;

at least one of the one or more additional sets of candidate components; and the connection edge; and display, via a display of the computing device, at least one of the one or more additional maps relating to the optimized cost solution.

\* \* \* \* \*